US012671756B2

(12) United States Patent
Jang et al.

(10) Patent No.: US 12,671,756 B2
(45) Date of Patent: Jun. 30, 2026

(54) ELECTRONIC DEVICE HAVING DIGITIZER WITH IMPROVED SENSING

(71) Applicant: Samsung Display Co., LTD., Yongin-si (KR)

(72) Inventors: Seokwon Jang, Yongin-si (KR); Hirotsugu Kishimoto, Yongin-si (KR); Yong-Kwan Kim, Yongin-si (KR); Hyunjae Na, Yongin-si (KR); Sungguk An, Yongin-si (KR); Chul Ho Jeong, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 300 days.

(21) Appl. No.: 18/374,252

(22) Filed: Sep. 28, 2023

(65) Prior Publication Data

US 2024/0163355 A1     May 16, 2024

(30) Foreign Application Priority Data

Nov. 10, 2022     (KR) ........................ 10-2022-0149549

(51) Int. Cl.
H04M 1/02          (2006.01)

(52) U.S. Cl.
CPC ....... H04M 1/0216 (2013.01); H04M 1/0268 (2013.01); H04M 1/0274 (2013.01); H04M 2201/38 (2013.01); H04M 2201/42 (2013.01)

(58) Field of Classification Search
CPC ............. H04M 1/0216; H04M 1/0268; H04M 1/0274; H04M 2201/38; H04M 2201/42; H04M 1/0214; G06F 2203/04102; G06F 1/1618; G06F 1/1643; G06F 1/1652;

G06F 3/041; G06F 3/044; G06F 3/0446; G06F 3/046; G06F 1/1626; G06F 1/1641; G06F 3/0412; G09F 9/301; H05K 5/0018; H05K 5/0217; H05K 5/0247; C08K 3/013;

(Continued)

(56) References Cited

U.S. PATENT DOCUMENTS

| 11,314,367 | B2 | 4/2022 | Jung |
| 2022/0086267 | A1* | 3/2022 | Shin ..................... H04M 1/0268 |

(Continued)

FOREIGN PATENT DOCUMENTS

KR          1020210133342 A      11/2021

*Primary Examiner* — Angelica Perez
(74) *Attorney, Agent, or Firm* — CANTOR COLBURN LLP

(57) ABSTRACT

An electronic device includes: a digitizer disposed under a display panel, where the digitizer includes an upper layer divided into a first non-foldable portion, a second non-foldable portion, and a foldable portion overlapping the foldable area, where a plurality of holes are defined in the foldable portion, and a lower layer including a first plate and a second plate spaced apart from each other along the first direction so as to define a space therebetween in an area overlapping the foldable portion, where the upper layer includes a base layer, first loop coils, second-first loop coils disposed in the first non-foldable portion, and second-second loop coils disposed in the second non-foldable portion, where the lower layer includes a third-first loop coil disposed in the first plate so as to overlap the foldable portion and a third-second loop coil disposed in the second plate so as to overlap the foldable portion.

19 Claims, 14 Drawing Sheets

(58) Field of Classification Search
  CPC .... C08K 3/04; C08K 7/02; C08K 7/06; C08L
                                101/00; H01B 5/14
  See application file for complete search history.

(56)                  References Cited

U.S. PATENT DOCUMENTS

| | | | |
|---|---|---|---|
| 2022/0221952 A1* | 7/2022 | Kishimoto | G06F 3/0412 |
| 2023/0215301 A1* | 7/2023 | Kishimoto | G06F 3/046 |
| | | | 361/679.27 |
| 2024/0152183 A1* | 5/2024 | Kishimoto | G06F 1/1616 |
| 2024/0160329 A1* | 5/2024 | Na | G06F 1/1652 |
| 2025/0044889 A1* | 2/2025 | Jung | H05K 5/0217 |

* cited by examiner

ELECTRONIC DEVICE HAVING DIGITIZER WITH IMPROVED SENSING

This application claims priority to Korean Patent Application 10-2022-0149549 filed on Nov. 10, 2022, and all the benefits accruing therefrom under 35 U.S.C. § 119, the content of which in its entirety is herein incorporated by reference.

BACKGROUND

Embodiments of the present disclosure described herein relate to an electronic device including a digitizer, and more particularly, relate to an electronic device including a digitizer having improved sensing performance of a foldable portion.

In the information society, importance of an electronic device as a visual information delivery medium is emerging. The electronic device is activated upon receiving an electrical signal. The electronic device includes a digitizer that detects an input applied from an outside out of a display layer displaying an image.

The digitizer of the electronic device may include various loop coils so as to be activated by an electrical signal. An area where the loop coils are activated responds to a signal applied from the outside.

SUMMARY

Embodiments of the present disclosure provide an electronic device including a digitizer with improved sensing performance of a foldable portion.

According to an embodiment, an electronic device includes: a display panel divided into a first non-foldable area and a second non-foldable area spaced apart from each other along a first direction, and a foldable area in which the display panel is foldable around a folding axis extending along a second direction intersecting the first direction, where the foldable area is disposed between the first non-foldable area and the second non-foldable area: and a digitizer disposed under the display panel and including upper and lower layers. The upper layer is divided into a first non-foldable portion overlapping the first non-foldable area, a second non-foldable portion overlapping the second non-foldable area, and a foldable portion overlapping the foldable area, where a plurality of holes are defined in the foldable portion. The lower layer includes a first plate and a second plate spaced apart from each other along the first direction so as to define a space therebetween in an area overlapping the foldable portion. The upper layer includes a base layer, first loop coils disposed on a top surface of the base layer, second-first loop coils disposed under the base layer and overlapping the first non-foldable portion, and second-second loop coils disposed under the base layer and overlapping the second non-foldable portion. The lower layer includes third-first loop coil disposed in the first plate and overlapping the foldable portion, and third-second loop coil disposed in the second plate and overlapping the foldable portion.

In an embodiment, a second-first loop coil adjacent to a boundary between the first non-foldable portion and the foldable portion among the second-first loop coils may be connected to the third-first loop coil via a first anisotropic conductive film, and a second-second loop coil adjacent to a boundary between the second non-foldable portion and the foldable portion among the second-second loop coils may be connected to the third-second loop coil via a second anisotropic conductive film.

In an embodiment, the first anisotropic conductive film may be disposed between the upper layer and the first plate so as to overlap the first non-foldable portion, and the second anisotropic conductive film may be disposed between the upper layer and the second plate so as to overlap the second non-foldable portion.

In an embodiment, the electronic device may further include: a first adhesive layer disposed between the upper layer and the first plate so as to overlap the first non-foldable portion, and a second adhesive layer disposed between the upper layer and the second plate so as to overlap the second non-foldable portion, where in an area overlapping the first non-foldable portion, the first adhesive layer may be spaced apart from the first anisotropic conductive film, and in an area overlapping the second non-foldable portion, the second adhesive layer may be spaced apart from the second anisotropic conductive film.

In an embodiment, the upper layer may further include: an upper base layer disposed on a top surface of the base layer so as to cover the first loop coils, an upper cover layer disposed on a top surface of the upper base layer, a lower base layer disposed under the base layer so as to cover the second-first loop coils and the second-second loop coils, and a lower cover layer disposed under the lower base layer, where the holes may extend through the upper cover layer, the lower cover layer and all layers therebetween.

In an embodiment, the upper layer may further include a connection pattern disposed between the upper base layer and the upper cover layer, and the connection pattern may be connected to a corresponding first loop coil among the first loop coils via a contact hole extending through the upper base layer.

In an embodiment, the upper layer may further include: a first upper bridge pattern disposed in a first contact hole extending through the lower base layer and the lower cover layer, where the first upper bridge pattern may connect the second-first loop coil adjacent to the boundary and the first anisotropic conductive film to each other, and a second upper bridge pattern disposed in a second contact hole extending through the lower base layer and the lower cover layer, where the second upper bridge pattern may connect the second-second loop coil adjacent to the boundary and the second anisotropic conductive film to each other.

In an embodiment, the first plate may further include a first base layer in which the third-first loop coil is disposed, and a first cover layer covering the third-first loop coil and disposed under the first base layer, where the second plate further includes a second base layer in which the third-second loop coil is disposed, and a second cover layer covering the third-second loop coil and disposed under the second base layer.

In an embodiment, the lower layer may further include a first lower bridge pattern disposed in a third contact hole extending through the first base layer, where the first lower bridge pattern connects the first anisotropic conductive film and the third-first loop coil to each other, and a second lower bridge pattern disposed in a fourth contact hole extending through the second base layer, where the second lower bridge pattern connects the second anisotropic conductive film and the third-second loop coil to each other.

In an embodiment, at least a portion of each of the first lower bridge pattern and the second lower bridge pattern may overlap the foldable portion.

In an embodiment, each of the base layer, the upper base layer, the upper cover layer, the lower base layer, the lower cover layer, the first base layer, the first cover layer, the second base layer, and the second cover layer may include a matrix containing fillers, and a reinforced fiber composite disposed in the matrix and including one of reinforcing fiber plastic and carbon fiber plastic.

In an embodiment, the matrix may include at least one of epoxy, polyester, polyamides, polycarbonates, polypropylene, polybutylene, or vinyl ester, where the filler may include at least one of silica, barium sulphate, sintered talc, barium titanate, titanium oxide, clay, alumina, mica, boehmite, zinc borate, or zinc tin oxide.

In an embodiment, the digitizer may include an active area for detecting an external input, and a peripheral area surrounding the active area, each of the first loop coils may be partially disposed in at least one of the active area in the foldable portion and the peripheral area in the foldable portion, and the second-first loop coils and the second-second loop coils may not be disposed in a portion of the active area in the foldable portion.

In an embodiment, a number of the first loop coils disposed between two holes adjacent along the second direction among the holes may be 4 or smaller.

In an embodiment, the holes may be classified into a first group hole including holes arranged along the second direction, and a second group hole including holes arranged along the second direction and spaced apart from the first group hole along the first direction, and the second group hole may be disposed shifted by a predefined distance from the first group hole in the second direction.

In an embodiment, a width in the first direction of each of the holes may be in a range of about 0.1 millimeters (mm) to about 1.0 mm, and a width in the second direction of each of the holes may be in a range of about 1 mm to about 10 mm.

In an embodiment, a spacing between two holes adjacent to each other along the first direction may be in a range of about 0.1 mm to about 1.0 mm, and a spacing between two holes adjacent to each other along the second direction may be in a range of about 0.1 mm to about 1.0 mm.

In an embodiment, a dimension in the first direction from a hole closest to the first non-foldable portion to a hole closest to the second non-foldable portion may be in a range of about 5 mm to about 30 mm.

In an embodiment, the digitizer may detect an external input based on electromagnetic resonance ("EMR").

According to an embodiment, an electronic device includes: a display panel divided into a first non-foldable area and a second non-foldable area spaced apart from each other along a first direction, and a foldable area in which the display panel is foldable around a folding axis extending along a second direction intersecting the first direction, where the foldable area is disposed between the first non-foldable area and the second non-foldable area; and a digitizer disposed under the display panel and including upper and lower layers. The upper layer is divided into a first non-foldable portion overlapping the first non-foldable area, a second non-foldable portion overlapping the second non-foldable area, and a foldable portion overlapping the foldable area, where a plurality of holes are defined in the foldable portion. The lower layer includes a first plate and a second plate spaced apart from each other along the first direction so as to define a space therebetween in an area overlapping the foldable portion. The upper layer includes a base layer, and first loop coils disposed on the base layer. The lower layer includes second-first loop coils disposed on the first plate so as to overlap the first non-foldable portion, and second-second loop coils disposed on the second plate so as to overlap the second non-foldable portion. A portion of each of the second-first loop coils and the second-second loop coils overlaps the foldable portion.

In an embodiment, the electronic device may further include a first adhesive layer disposed between the upper layer and the first plate so as to overlap the first non-foldable portion, and a second adhesive layer disposed between the upper layer and the second plate so as to overlap the second non-foldable portion.

In an embodiment, the electronic device may further include a first anisotropic conductive film disposed between the upper layer and the first plate so as to overlap the first non-foldable portion, where the first anisotropic conductive film is spaced apart from the first adhesive layer, and a second anisotropic conductive film disposed between the upper layer and the second plate so as to overlap the second non-foldable portion, where the second anisotropic conductive film is spaced apart from the second adhesive layer.

In an embodiment, the first anisotropic conductive film may be connected to the portion of the second-first loop coils overlapping the foldable portion, and the second anisotropic conductive film may be connected to the portion of the second-second loop coils overlapping the foldable portion.

In an embodiment, the upper layer may further include an upper base layer disposed on the base layer so as to cover the first loop coils, an upper cover layer disposed on a top surface of the upper base layer, and a lower cover layer disposed under the base layer, where the holes may extend through the upper cover layer and the lower cover layer and all layers therebetween.

In an embodiment, the upper layer may further include a connection pattern disposed between the upper base layer and the upper cover layer, where the connection pattern is connected to a corresponding first loop coil among the first loop coils via a contact hole extending through the upper base layer.

In an embodiment, the upper layer may further include: a first upper bridge pattern disposed in a first contact hole extending through the lower cover layer, where the first upper bridge pattern may be connected to the first anisotropic conductive film, and a second upper bridge pattern disposed in a second contact hole extending through the lower cover layer, where the second upper bridge pattern may be connected to the second anisotropic conductive film.

In an embodiment, the first plate may include a first base layer in which the second-first loop coils are disposed, and a first cover layer covering the second-first loop coils and disposed on the first base layer, where the second plate may include a second base layer in which the second-second loop coils are disposed, and a second cover layer covering the second-second loop coils and disposed on the second base layer.

In an embodiment, the lower layer may further include a first lower bridge pattern disposed in a third contact hole extending through the first base layer, where the first lower bridge pattern may be connected to the first anisotropic conductive film and the portion of the second-first loop coils overlapping the foldable portion, and a second lower bridge pattern disposed in a fourth contact hole extending through the second base layer, where the second lower bridge pattern may be connected to the second anisotropic conductive film and the portion of the second-second loop coils overlapping the foldable portion.

In an embodiment, each of the first loop coils and the connection pattern partially may overlap the foldable portion.

In an embodiment, a number of the first loop coils disposed between two holes adjacent along the second direction among the holes may be 4 or smaller.

BRIEF DESCRIPTION OF THE FIGURES

The above and other aspects and features of the present disclosure will become apparent by describing in detail embodiments thereof with reference to the accompanying drawings.

FIG. 3 is a cross-sectional view of an electronic device according to an embodiment of the present disclosure.

FIG. 4 is a cross-sectional view of a digitizer according to an embodiment of the present disclosure.

FIG. 9 is a cross-sectional view of a digitizer according to an embodiment of the present disclosure.

DETAILED DESCRIPTION

Figure 1A:
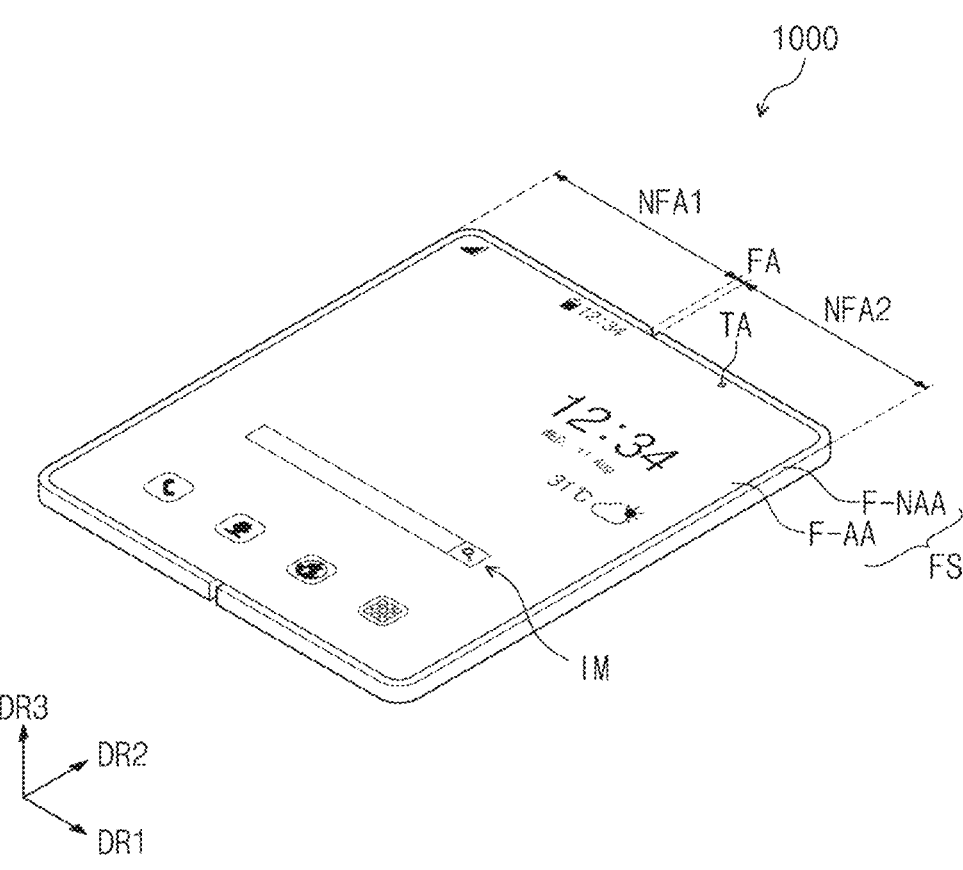
FIG. 1A is a perspective view of an unfolded state of an electronic device according to an embodiment of the present disclosure.

As used herein, when a component (or a region, a layer, a portion, and the like) is referred to as being "on", "connected to", or "coupled to" another component, it means that the component may be directly disposed/connected/coupled on another component or a third component may be disposed between the component and another component.

Like reference numerals refer to like components. In addition, in the drawings, thicknesses, ratios, and dimensions of components are exaggerated for effective description of technical content. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "and/or" includes all of one or more combinations that the associated components may define.

Terms such as "first", "second", and the like may be used to describe various components, but the components should not be limited by the terms. The above terms are used only for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components illustrated in the drawings. The above terms are relative concepts, and are described with reference to directions indicated in the drawings.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present disclosure will be described with reference to drawings.

Figure 1B:
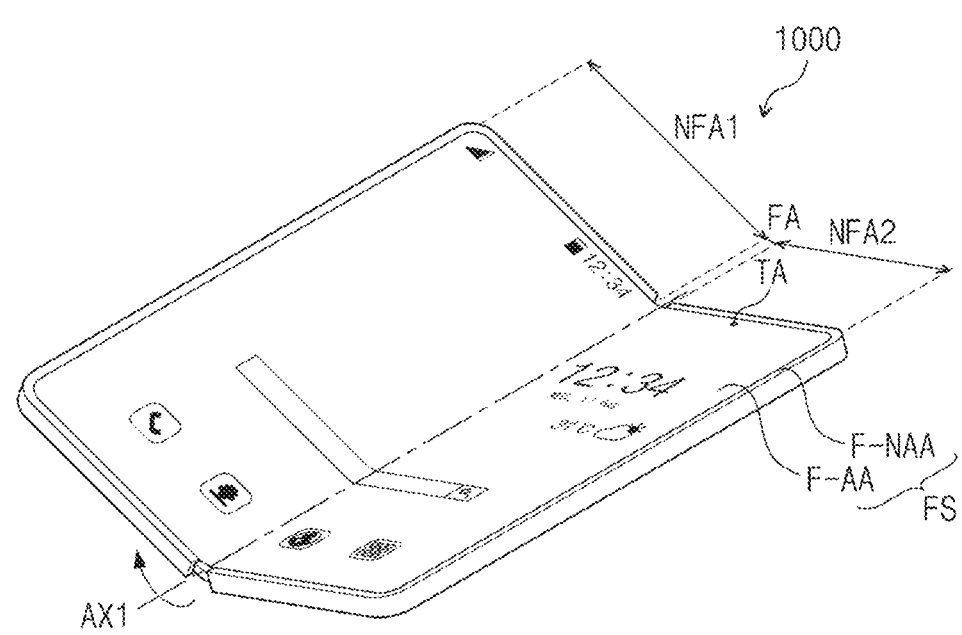
FIG. 1B is a perspective view of a folding operation state of an electronic device according to an embodiment of the present disclosure.
Figure 1B:
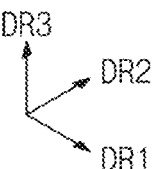
Figure 1C:
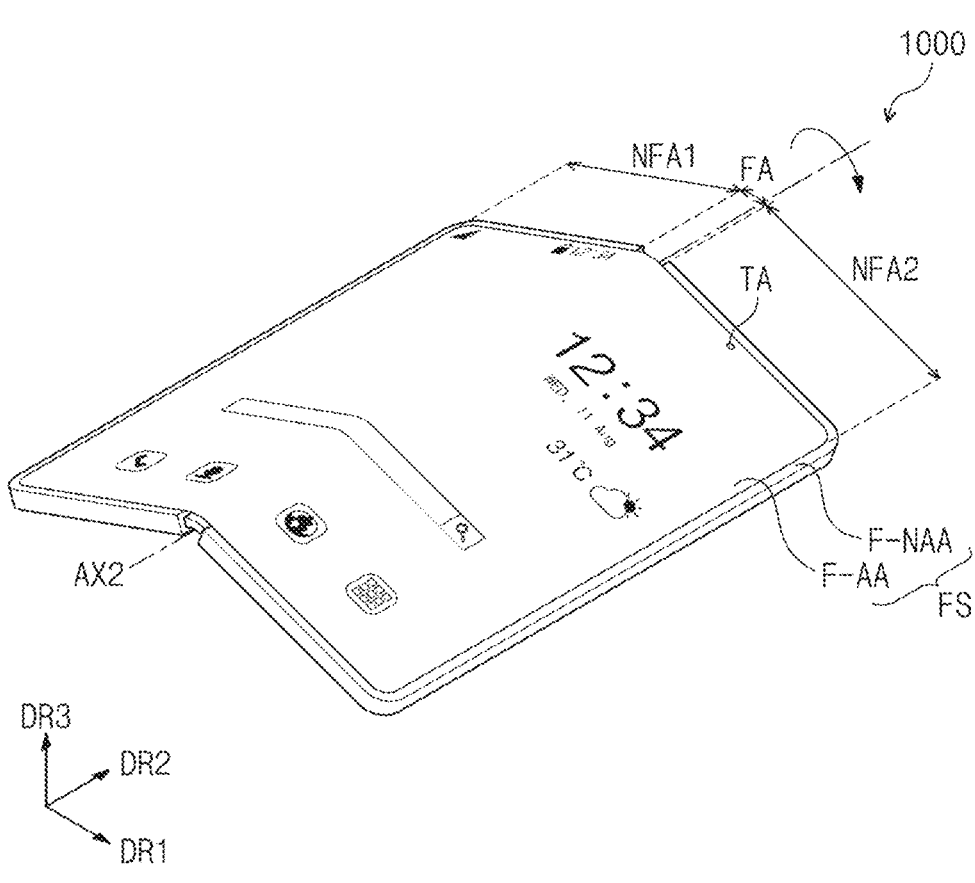
FIG. 1C is a perspective view of a folding operation state of an electronic device according to an embodiment of the present disclosure.
Figure 1D:
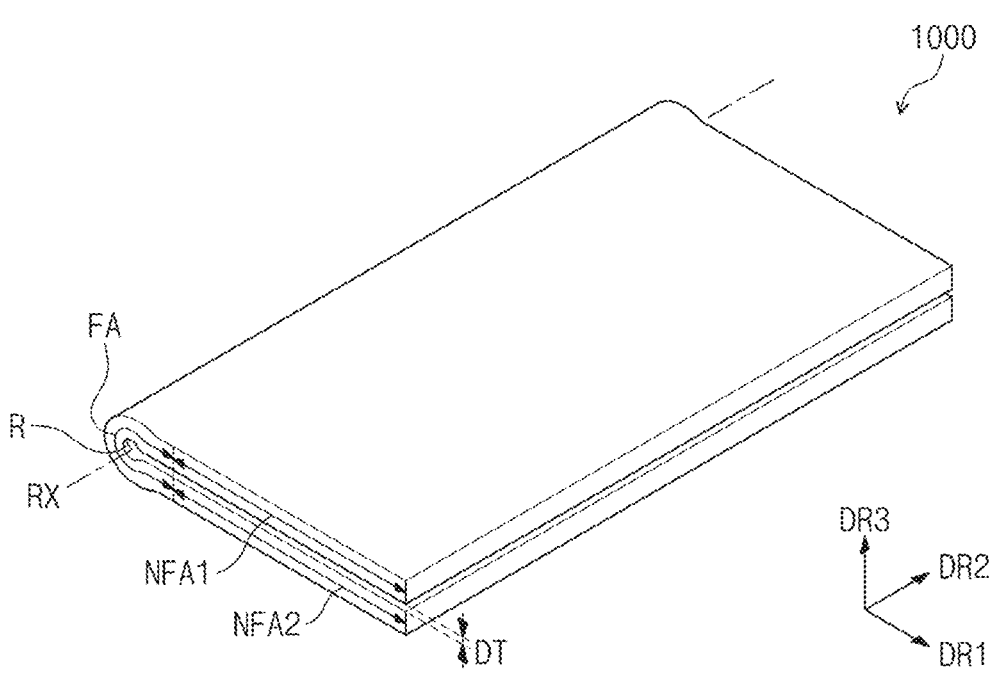
FIG. 1D is a perspective view of an electronic device in a folded state according to an embodiment of the present disclosure.
Figure 1E:
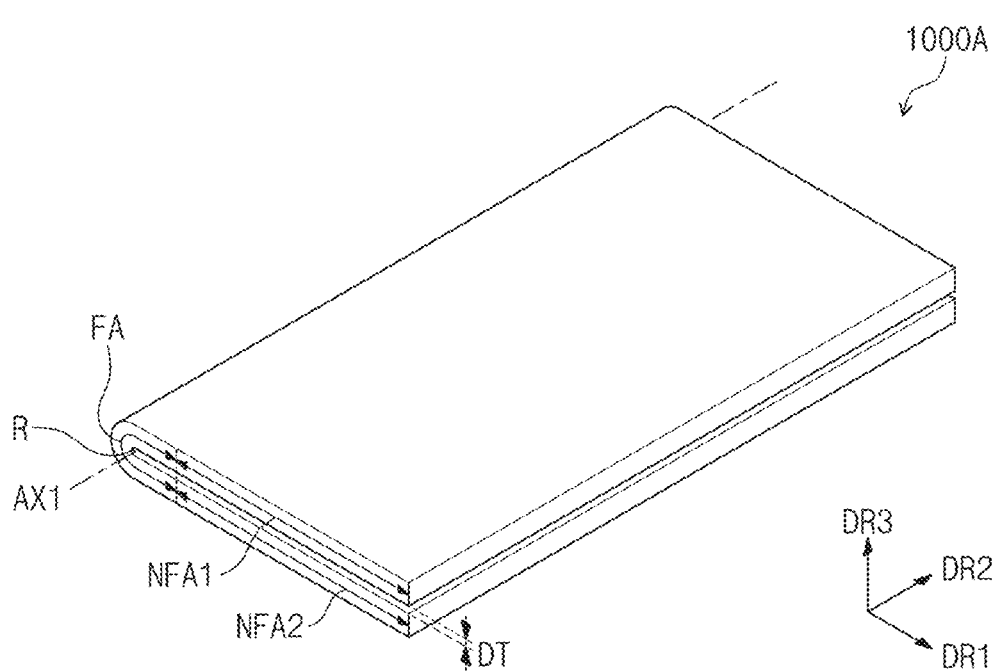
FIG. 1E is a perspective view of an electronic device in a folded state according to an embodiment of the present disclosure.

FIG. 1A is a perspective view of an unfolded state of an electronic device according to an embodiment of the present disclosure. FIG. 1B is a perspective view of a folding operation state of an electronic device according to an embodiment of the present disclosure. FIG. 1C is a perspective view of a folding operation state of an electronic device according to an embodiment of the present disclosure. FIG. 1D is a perspective view of an electronic device in a folded state according to an embodiment of the present disclosure. FIG. 1E is a perspective view of an electronic device in a folded state according to an embodiment of the present disclosure.

Referring to FIG. 1A to FIG. 1D, an electronic device 1000 according to the present disclosure may be a device activated according to an electrical signal. The electronic device 1000 may include various embodiments. In an embodiment, for example, the electronic device 1000 may include a tablet, a laptop computer, a computer, a smart television, and the like. In this embodiment, the electronic device 1000 is embodied as a smart phone by way of example.

The electronic device 1000 may display an image IM in a third direction DR3 from a display surface FS parallel to each of the first direction DR1 and the second direction DR2. The display surface FS from which the image IM is displayed may correspond to a front surface of the electronic device 1000. The image IM may include a still images as well as a moving image. In FIG. 1A to FIG. 1C, an internet search window and a clock window are shown as one example of the image IM.

According to the present embodiment, a front (or top) surface and a rear (or bottom) surface of each of components are defined with respect to a direction in which the image IM is displayed in an unfolded state. The front and rear surfaces are opposed to each other in the third direction DR3, and a normal direction of each of the front and rear surfaces may be parallel to the third direction DR3.

The electronic device 1000 may detect an external input applied from an outside. The external input may be a user's input. The user's input may include various types of inputs such as a portion of the user's body, an electromagnetic pen, light, heat, or a pressure, etc. When the electronic device 1000 detects an input from the electromagnetic pen, the electronic device 1000 may further include a digitizer driven using Electro Magnetic Resonance (EMR). The present disclosure is not limited to any one embodiment.

FIG. 1A shows the electronic device 1000 in an unfolded state. The display surface FS of the electronic device 1000 may include an active area F-AA and a peripheral area F-NAA. The peripheral area F-NAA is adjacent to the active area F-AA. The peripheral area F-NAA may have light transmittance lower than light transmittance of the active area F-AA and may have a predefined color.

According to this embodiment, the peripheral area F-NAA may surround the active area F-AA. Accordingly, a shape of the active area F-AA may be substantially defined by the peripheral area F-NAA. However, this is illustrated by way of example. The peripheral area F-NAA may be disposed adjacent to only one side of the active area F-AA, or the peripheral area F-NAA may be omitted from the display surface FS.

The display surface FS may further include a signal transmissive area TA. It is illustrated by way example that the signal transmissive area TA is contained in the active area F-AA. The present disclosure is not limited thereto, and in another embodiment, the signal transmissive area TA may be contained in the peripheral area F-NAA or may be surrounded with each of the active area F-AA and the peripheral area F-NAA.

The signal transmissive area TA has light transmittance higher than light transmittance of each of the active area F-AA and the peripheral area F-NAA. Natural light, visible light or infrared light may travel to the signal transmissive area TA.

The electronic device 1000 may further include a sensor for capturing an external image using visible light extending through the signal transmissive area TA or determining proximity of an external object using infrared light. The sensor may overlap the signal transmissive area TA. Accordingly, the electronic device 1000 including the sensor with improved reliability may be provided.

Referring to FIG. 1B, the electronic device 1000 according to an embodiment may be a foldable electronic device 1000. In an embodiment, for example, the electronic device 1000 may be folded along an imaginary first folding axis AX1 extending in a second direction DR2. The first folding axis AX1 may be formed on the display surface FS. As the electronic device 1000 is folded, components included in the electronic device 1000 may be folded correspondingly.

The electronic device 1000 may include a foldable area FA foldable around the first folding axis AX1, and a first non-foldable area NFA1 and a second non-foldable area NFA2 spaced apart from each other in the first direction DR1 while the foldable area FA is interposed therebetween.

The electronic device 1000 may be folded in an in-folding scheme in which the electronic device 1000 is folded around the first folding axis AX1 such that the first non-foldable area NFA1 and the second non-foldable area NFA2 face each other.

Referring to FIG. 1C, the electronic device 1000 may be folded in an out-folding scheme in which the electronic device 1000 is folded around a second folding axis AX2 such that the first non-foldable area NFA1 and the second non-foldable area NFA2 are opposite to each other. The second folding axis AX2 may be formed on a surface opposite to the display surface FS.

In the present disclosure, 'a first mode' may be defined as a state in which the electronic device 1000 has been unfolded, while 'a second mode' may be defined as a state in which the electronic device 1000 has been folded in the in-folding scheme as shown in FIG. 1B or in the out-folding scheme as shown in FIG. 1C.

The electronic device 1000 according to an embodiment may be folded in only one scheme selected from the in-folding scheme and the out-folding scheme around corresponding one of the first and second folding axes AX1 and AX2 extending in the same line. However, the present disclosure is not limited thereto, and in another embodiment, the electronic device 1000 may be folded in the in-folding scheme or the out-folding scheme around one folding axis.

Referring to FIG. 1D, when the electronic device 1000 of an embodiment has been folded in the in-folding scheme, at least a portion of the foldable area FA may have a predefined curvature. The foldable area FA may have a center of curvature RX on an inner side surface of the foldable area FA, and the electronic device 1000 may be folded around the center of curvature RX so as to have a predefined radius of curvature R. According to an embodiment, the radius of curvature R may be greater than a spacing DT between the first non-foldable area NFA1 and the second non-foldable area NFA2. Accordingly, in the second mode, the electronic device 1000 may be folded such that the first non-foldable area NFA1 and the second non-foldable area NFA2 may be slimmer.

Referring to FIG. 1E, when an electronic device 1000A according to an embodiment is folded in the in-folding scheme, the electronic device 1000A may be folded so as to have a predefined radius of curvature R. In this regard, the spacing DT between a portion extending from the foldable area FA to the first non-foldable area NFA1 and a portion extending from foldable area FA to the second non-foldable area NFA2 may be constant along the first direction DR1. However, the present disclosure is not limited to any one embodiment.

Figure 2:
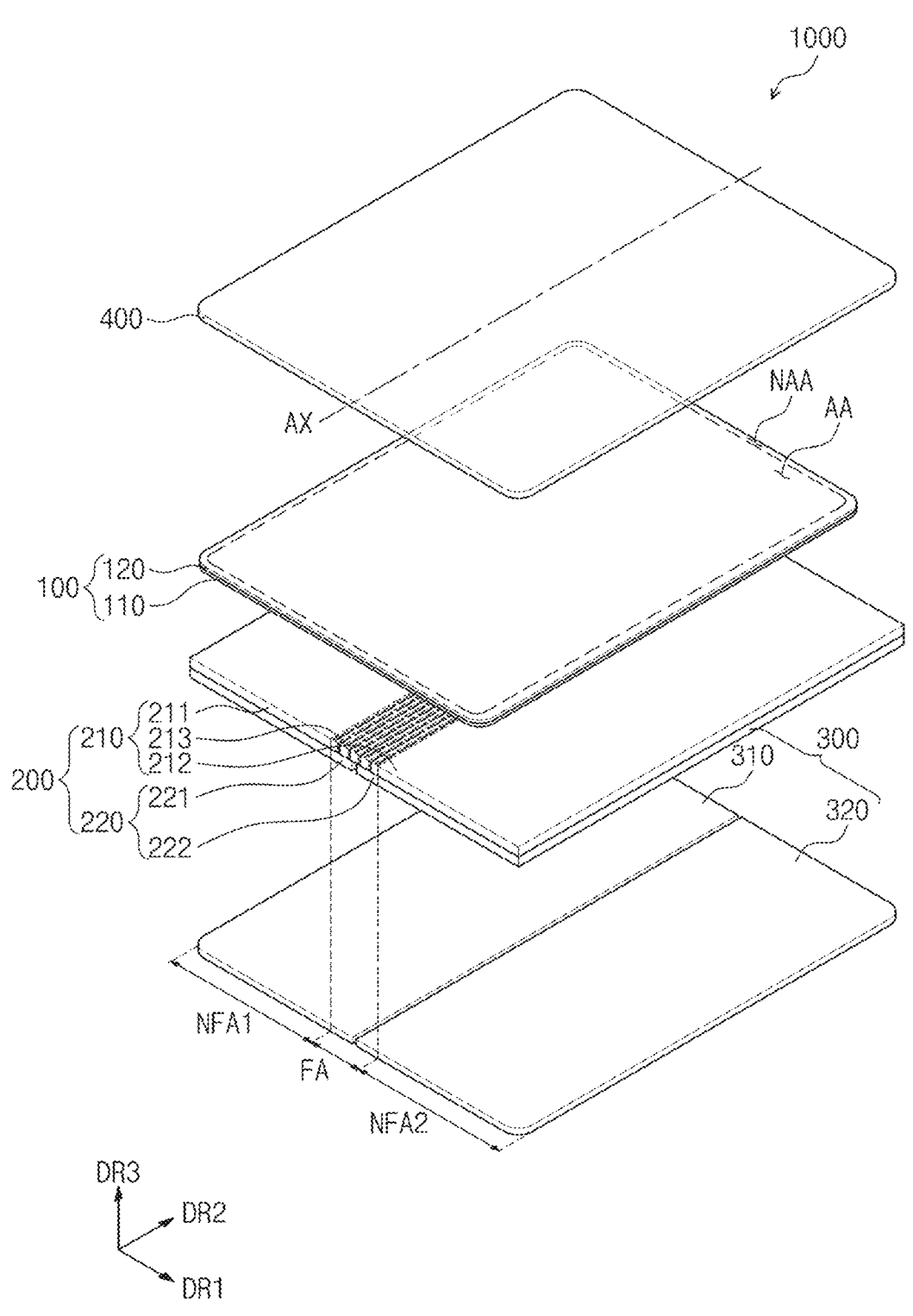
FIG. 2 is an exploded perspective view of an electronic device according to an embodiment of the present disclosure.
Figure 3:
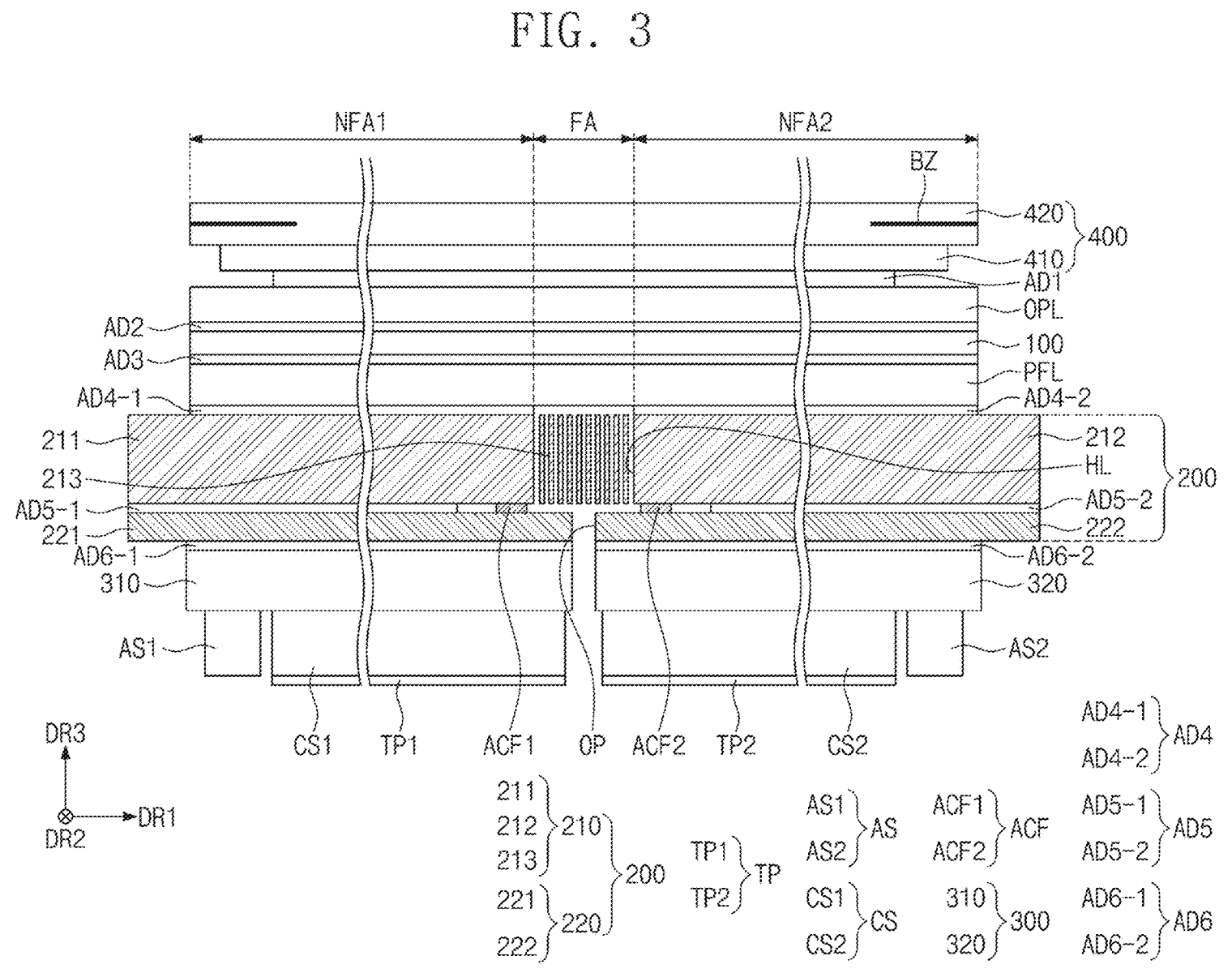

FIG. 2 is an exploded perspective view of an electronic device according to an embodiment of the present disclosure. FIG. 3 is a cross-sectional view of an electronic device according to an embodiment of the present disclosure.

Referring to FIG. 2 and FIG. 3, the electronic device 1000 may include a display module 100, a digitizer 200, a cushion layer 300, and a window 400. More specifically, as shown in FIG. 3, the electronic device 1000 may include a plurality of adhesive layers AD1 to AD6, upper functional layers disposed between the display module 100 and the window 400, and lower functional layers disposed under the digitizer 200.

Each of the adhesive layers AD1 to AD6 to be described below may include one of an optical clear adhesive ("OCA"), an optical clear resin ("OCR"), and a pressure sensitive adhesive ("PSA").

The display module 100 according to the present disclosure may be flexible. An active area AA of the display module 100 may correspond to the active area F-AA of the electronic device 1000 as shown in FIG. 1A, and a peripheral area NAA of the display module 100 may correspond to the peripheral area F-NAA of the electronic device 1000 as shown in FIG. 1A.

The display module 100 may include a display panel 110 displaying an image and an input sensor 120 detecting an external input. The display panel 110 may be a light-emitting display panel 110, and is not particularly limited. In an embodiment, for example, the display panel 110 may be an organic light-emitting display panel 110 or an inorganic light-emitting display panel 110. A light-emitting element of the organic light-emitting display panel 110 may include an organic light-emitting material. A light-emitting element of the inorganic light-emitting display panel 110 may include a quantum dot or a quantum rod. Further, the display panel 110 according to an embodiment may include a micro LED element and/or a nano LED element, and is not particularly limited.

The display panel 110 may include a plurality of pixels, each including one of the light-emitting elements. The light-emitting layers included in each of the light-emitting elements are disposed in the active area AA and emit light of predefined colors. When a plurality of light-emitting layers are provided, the light-emitting elements may correspond to the light-emitting layers, respectively. Alternatively, when the light-emitting layer is provided as a single layer, color filters or color conversion members disposed on the light-emitting layer may be further included. Conductive patterns for activating the light-emitting elements may be disposed in the peripheral area NAA.

The input sensor 120 may be disposed on the display panel 110. The input sensor 120 may operate in a capacitive scheme. The input sensor 120 may detect a contact position of the user's hand and/or a strength applied therefrom across an entirety of the active area F-AA. The input sensor 120 may include sensing electrodes insulated from each other, routing coils connected to corresponding sensing electrodes, and at least one sensing insulating layer.

The input sensor 120 according to an embodiment may be formed on the display panel 110 via a consecutive process. This case may be expressed as the input sensor 120 being 'directly disposed' on the display panel 110. The input sensor 120 being directly disposed on the display panel 110 may mean that another component is not disposed between the input sensor 120 and the display panel 110. That is, a separate adhesive member may not be disposed between the input sensor 120 and the display panel 110. However, the present disclosure is not limited thereto, and in another embodiment, the input sensor 120 may be provided as a separate module and then may be coupled to the display panel 110 via an adhesive layer.

The digitizer 200 may be disposed under the display module 100. The digitizer 200 according to the present disclosure may detect an input from an electromagnetic pen. In this regard, the digitizer 200 may operate using Electro Magnetic Resonance (EMR).

The digitizer 200 according to the present disclosure may detect an input from the electromagnetic pen and, at the same time, may be disposed under the display module 100 so as to support the display module 100. The digitizer 200 according to the present disclosure may include an upper layer 210 and a lower layer 220.

The upper layer 210 may be divided into a first non-foldable portion 211, a second non-foldable portion 212, and a foldable portion 213. The first non-foldable portion 211 may overlap at least a portion of the first non-foldable area NFA1. The second non-foldable portion 212 may overlap at least a portion of the second non-foldable area NFA2. The foldable portion 213 may overlap the foldable area FA.

Accordingly, the foldable portion 213 may be disposed between the first non-foldable portion 211 and the second non-foldable portion 212. Holes HL may be defined in the foldable portion 213 according to the present disclosure.

According to an embodiment, a width in the first direction DR1 of the foldable portion 213 may be in a range of about 5 mm to about 30 mm.

The holes HL extending from a front surface of the upper layer 210 to a rear surface thereof in the third direction DR3 may be defined in the foldable portion 213 of the upper layer 210 according to the present disclosure. The holes HL may overlap the foldable area FA, and the holes HL may be arranged so as to be spaced apart from each other along each of the first direction DR1 and the second direction DR2.

The lower layer 220 may be disposed under the upper layer 210. The lower layer 220 may include a first plate 221 and a second plate 222.

One portion of the first plate 221 may overlap the first non-foldable portion 211, and the remaining portion of the first plate 221 may overlap the foldable portion 213. One portion of the second plate 222 may overlap the second non-foldable portion 212, and the remaining portion of the second plate 222 may overlap the foldable portion 213.

According to an embodiment, the first plate 221 and the second plate 222 may be spaced apart from each other along the first direction DR1 so as to define a predefined space OP therebetween and in an area overlapping the foldable portion 213.

According to the present disclosure, each of the upper layer 210 and the lower layer 220 may include loop coils and at least one base layer on which the loop coils are disposed. Each of the base layers may include a matrix and a reinforcing fiber composite disposed in the matrix. The reinforced fiber composite may be carbon fiber reinforced plastic ("CFRP") or glass fiber reinforced plastic ("GFRP"). The matrix may include a polymer resin. The matrix may include a thermoplastic resin.

The digitizer 200 according to the present disclosure may function as a protection member for protecting the display module 100, and at the same time, may act as a sensing member for sensing an input from the electromagnetic pen. The functions of the protection member and the sensing member will be described later.

The cushion layer 300 may be disposed under the digitizer 200. The cushion layer 300 may protect the display module 100 from impact transmitted from a location disposed under the display module 100. The cushion layer 300 may include foam or sponge. The foam may include polyurethane foam or thermoplastic polyurethane foam. When the cushion layer 300 includes the foam, the cushion layer 300 may further include a barrier film as a base layer. In this case, a foaming agent may be foamed on the barrier film to form the cushion layer 300.

The cushion layer 300 may include a first cushion layer 310 and a second cushion layer 320. The first cushion layer 310 may overlap with the first plate 221. The second cushion layer 320 may overlap with the second plate 222. The first cushion layer 310 and the second cushion layer 320 may be spaced apart from each other along the first direction DR1 so as to define a predefined space OP therebetween and in an area overlapping the foldable portion 213.

The first cushion layer 310 and the second cushion layer 320 may prevent foreign substances from entering the holes HL defined in the foldable portion 213 when the electronic device 1000 is in the first mode. When the electronic device 1000 is in the second mode, and even when the foldable portion 213 is folded so as to have a predefined curvature, the digitizer 200 may be easily deformed as the first cushion layer 310 and the second cushion layer 320 are spaced apart from each other so as to define the space therebetween in the area overlapping the foldable portion 213.

The window 400 is disposed on a top surface of the display module 100. The window 400 may include a first layer 410, a second layer 420, and a bezel pattern BZ. The window 400 may include an optically transparent material so that light provided from the display module 100 may travel therethrough. The window 400 provides the display surface FS (FIG. 1A) of the electronic device 1000.

The window 400 may be made of a soft material. Accordingly, the window 400 may be folded or unfolded around the folding axis AX1 (FIG. 1B). That is, according to an operation of the first mode or the second mode, the window 400 may also be deformed in a corresponding manner to the shape of the digitizer 200.

The first layer 410 according to an embodiment may include a thin film glass or a synthetic resin film. When the first layer 410 includes the thin film glass, a thickness of the first layer 410 may be 100 micrometers (μm) or smaller. In an embodiment, for example, the thickness of the first layer 410 may be 30 μm. However, the present disclosure is not limited thereto.

When the first layer 410 includes the synthetic resin film, the first layer 410 may include a polyimide ("PI") film, or a polyethylene terephthalate ("PET") film.

The first layer 410 may have a multi-layer structure or a single-layer structure. In an embodiment, for example, the first layer 410 may include a plurality of synthetic resin films bonded to each other via an adhesive, or may include a glass substrate and a synthetic resin film bonded to each other via an adhesive.

The second layer 420 is disposed on the first layer 410. The second layer 420 may include a material having a relatively lower modulus than modulus of the first layer 410. In an embodiment, for example, the second layer 420 may be a film including an organic material. The second layer 420 may have a relatively larger thickness than the thickness of the first layer 410. Accordingly, the second layer 420 may protect a top surface of the first layer 410.

The second layer 420 may include at least one functional layer. The functional layer may include at least one of a window protection layer, an anti-fingerprint layer, and an anti-reflection layer.

The window 400 transmits the image from the display module 100 therethrough, and at the same time alleviates external impact, thereby preventing the display module 100 from being damaged or malfunctioning due to the external impact.

An optical layer OPL may be disposed between the display module 100 and the window 400. The optical layer OPL may be coupled to the window 400 via the first adhesive layer AD1, and the optical layer OPL may be coupled to the display module 100 via the second adhesive layer AD2.

The optical layer OPL may reduce the reflectance of external light. The optical layer OPL may include a stretchable synthetic resin film. In an embodiment, for example, the optical layer OPL may be provided by dyeing a polyvinyl alcohol film (a "PVA" film) with an iodine compound. Alternatively, the optical layer OPL may include a color filter. The optical layer OPL may include various layers as long as they may reduce the reflectance of external light. The present disclosure is not limited to any one embodiment.

A panel protection layer PFL may be disposed between the display module 100 and the digitizer 200. The panel protection layer PFL and the display module 100 may be coupled to each other via the third adhesive layer AD3. The panel protection layer PFL may be disposed under the display module 100 so as to protect a lower portion of the display module 100. The panel protection layer PFL may include a flexible plastic material. In an embodiment, for example, the panel protection layer PFL may include polyethylene terephthalate.

The digitizer 200 and the panel protection layer PFL may be coupled to each other via the fourth adhesive layer AD4. The fourth adhesive layer AD4 may include a first portion AD4-1 and a second portion AD4-2. The first portion AD4-1 and the second portion AD4-2 may be spaced apart from each other while the foldable area FA is disposed therebetween.

The first portion AD4-1 may couple the first non-foldable portion 211 and a portion of the panel protection layer PFL to each other, while the second portion AD4-2 may couple the second non-foldable portion 212 and another portion of the panel protection layer PFL to each other.

The electronic device 1000 may further include a metal plate CS, an insulating layer TP, and a step compensation member AS disposed under the cushion layer 300. The metal plate CS may absorb external impact so as to protect the display module 100. The metal plate CS may include stainless steel. The metal plate CS may include a first metal layer CS1 and a second metal layer CS2. The first metal layer CS1 and the second metal layer CS2 may be coupled to the first cushion layer 310 and the second cushion layer 320 via separate adhesive layers, respectively.

The insulating layer TP is disposed under the metal plate CS. The insulating layer TP may prevent static electricity from flowing into the metal plate CS. The insulating layer TP may be embodied as an insulating film. The insulating layer TP may include a first insulating layer TP1 disposed under the first metal layer CS1 and a second insulating layer TP2 disposed under the second metal layer CS2.

The step compensation member AS is coupled to a bottom of the cushion layer 300. The step compensation member AS may be embodied as a double-sided tape or an insulating film. The step compensation member AS may be divided into a first step compensation member AS1 and a second step compensation member AS2, which may be coupled to the first cushion layer 310 and the second cushion layer 320, respectively. The step compensation member AS may compensate for a step formed between the cushion layer 300 and the layers disposed under the cushion layer 300.

Figure 4:
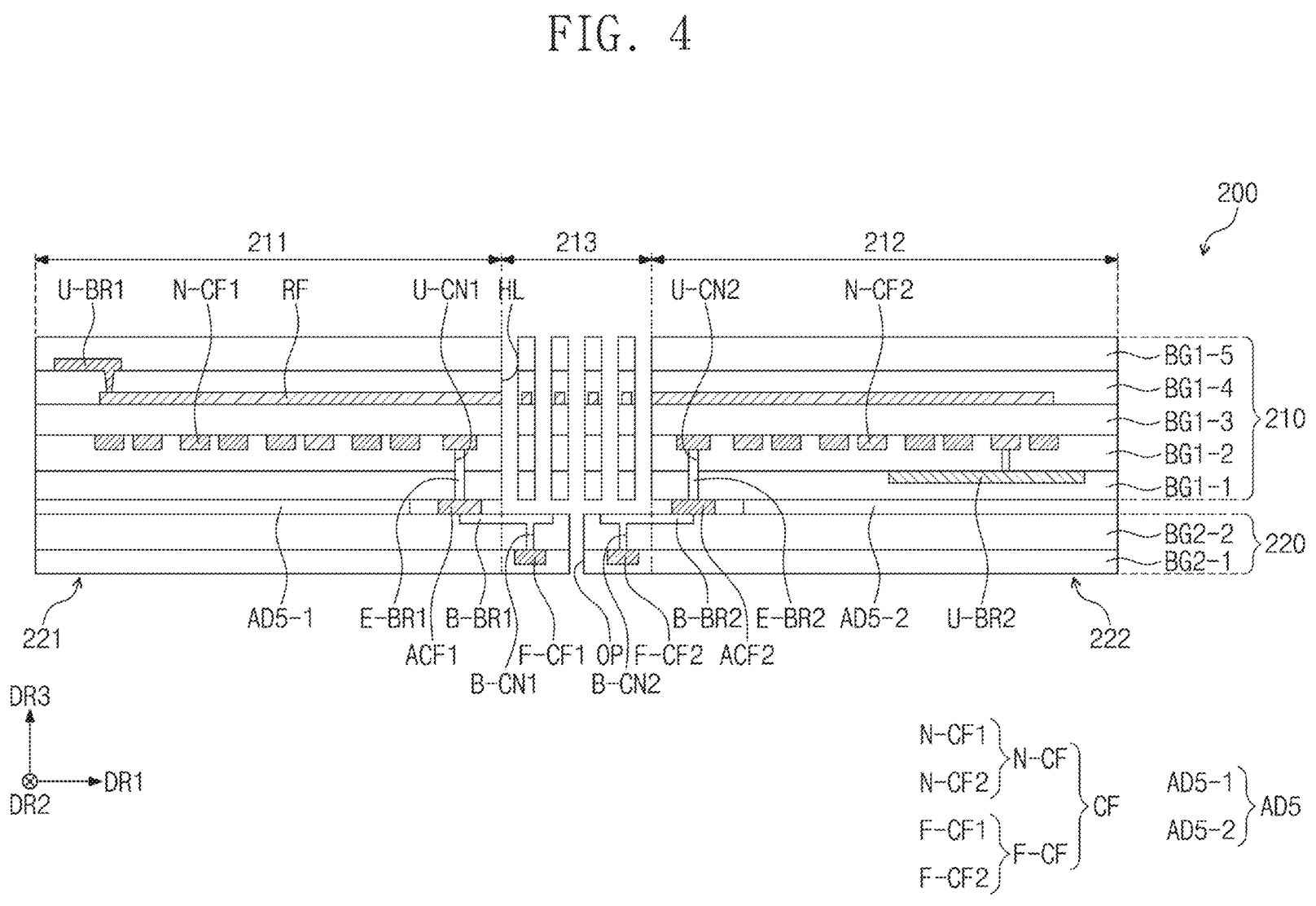
Figure 5A:
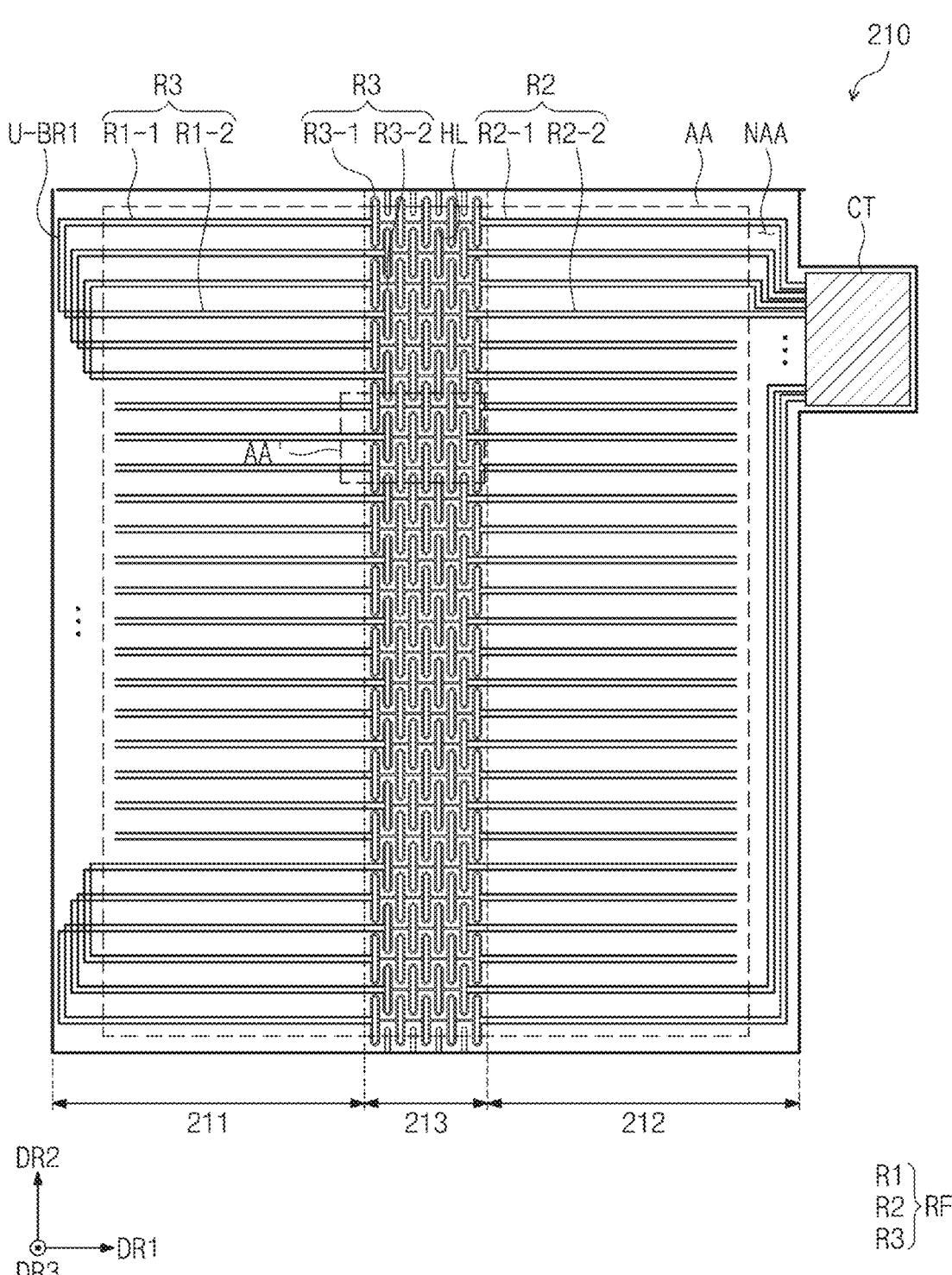
FIG. 5A is a plan view of a digitizer according to an embodiment of the present disclosure.
Figure 5B:
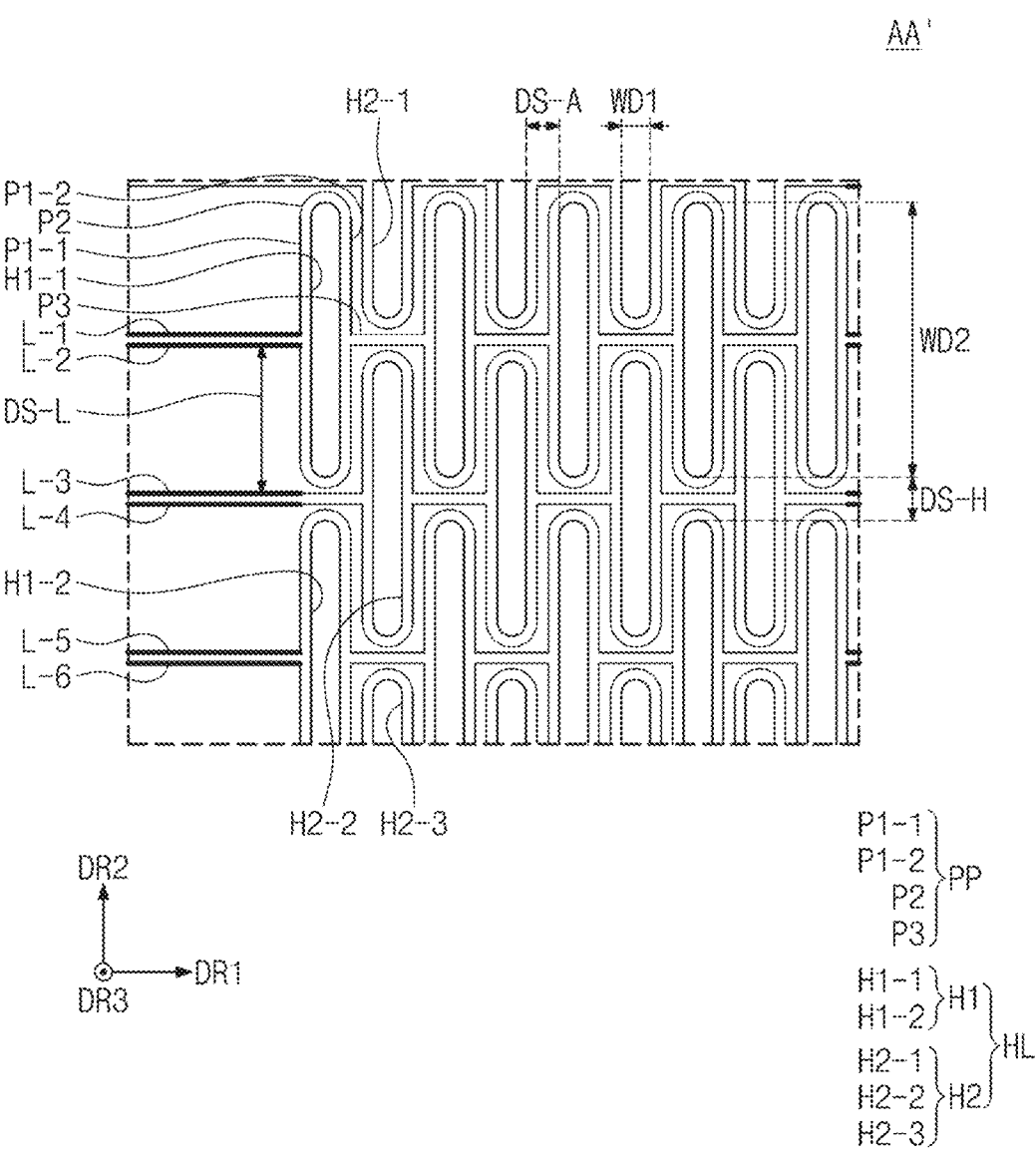
FIG. 5B is an enlarged plan view of an AA' area of FIG. 5A.
Figure 6:
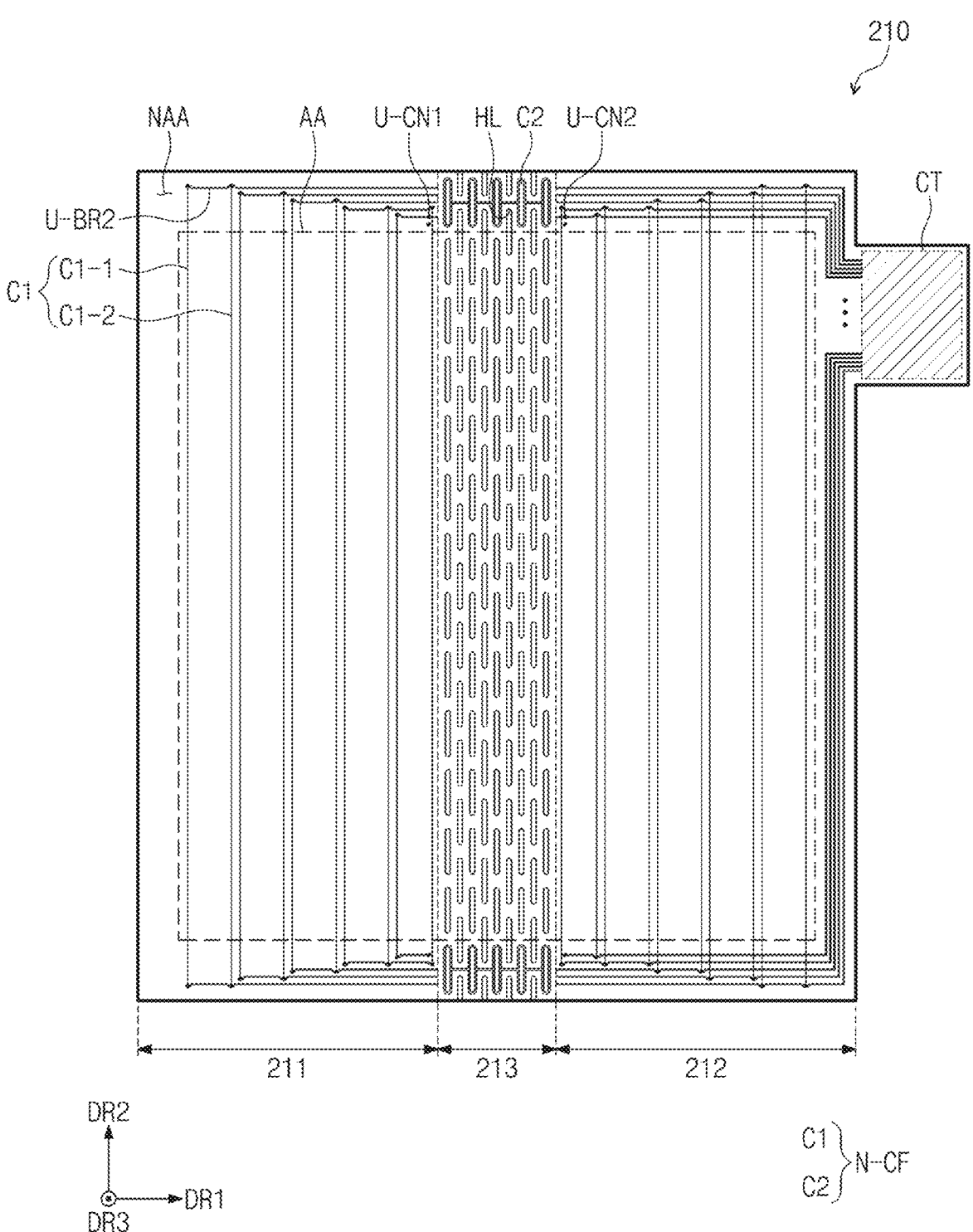
FIG. 6 is a plan view of a digitizer according to an embodiment of the present disclosure.

FIG. 4 is a cross-sectional view of a digitizer according to an embodiment of the present disclosure. FIG. 5A is a plan view of a digitizer according to an embodiment of the present disclosure. FIG. 5B is an enlarged plan view of the AA' area in FIG. 5A. FIG. 6 is a plan view of a digitizer according to an embodiment of the present disclosure. FIG.

7 is a plan view of a digitizer according to an embodiment of the present disclosure. The same/similar reference numerals are allocated to components identical/similar to those as described in FIG. 1A to FIG. 3, and redundant descriptions thereof are omitted.

Referring to FIG. 4, the digitizer 200 according to an embodiment may include the upper layer 210 and the lower layer 220. The upper layer 210 may include first to fifth upper base layers BG1-1 to BF1-5, first loop coils RF, second-first and second-second loop coils N-CF1 and N-CF2 of upper loop coils N-CF of second loop coils CF, first and second connection patterns U-BR1 and U-BR2, and upper bridge patterns E-BR1 and E-BR2.

In this embodiment, the first loop coils RF may be referred to as sensing coils, and the second loop coils CF may be referred to as driving coils. However, the present disclosure is not limited thereto, and vice versa. When current flows through the second loop coils CF, lines of magnetic force may be induced between the second loop coils CF and the first loop coils RF. The first loop coils RF may detect an induced electromagnetic force emitted from the electromagnetic pen and output a detection signal to the first loop coils RF.

The first loop coils RF may be disposed on a top surface of the third upper base layer BG1-3. According to the present disclosure, the first loop coils RF may overlap the first non-foldable portion 211, the second non-foldable portion 212, and the foldable portion 213 of the upper layer 210, respectively.

The fourth upper base layer BG1-4 may cover the first loop coils RF and may be disposed on the third upper base layer BG1-3.

The first connection pattern U-BR1 may be disposed on the fourth upper base layer BG1-4. The first connection pattern U-BR1 may be connected to a corresponding first loop coil RF via a contact hole defined in the fourth upper base layer BG1-4. The first connection pattern U-BR1 may include a plurality of first connection patterns. As the first connection patterns U-BR1 are disposed in a different layer from a layer in which the first loop coils RF are disposed, each of the first connection patterns U-BR1 may be connected to an end of each of the first loop coils RF in an intersecting manner.

The fifth upper base layer BG1-5 (an upper cover layer) may cover the first connection pattern U-BR1 and may be disposed on the fourth upper base layer BG1-4. The fourth adhesive layer AD4 as described in FIG. 3 may be disposed on the fifth upper base layer BG1-5.

The upper loop coils N-CF of the second loop coils CF may be disposed on a bottom surface of the third upper base layer BG1-3. The upper loop coils N-CF may include the second-first loop coils N-CF1 disposed in the first non-foldable portion 211 and the second-second loop coils N-CF2 disposed in the second non-foldable portion 212.

The second upper base layer BG1-2 may cover the upper loop coils N-CF and may be disposed under the third upper base layer BG1-3.

The second connection pattern U-BR2 may be disposed under the second upper base layer BG1-2. The second connection pattern U-BR2 may be connected to corresponding upper loop coils N-CF via a contact hole defined in the second upper base layer BG1-2. The second connection pattern U-BR2 may include a plurality of second connection patterns. As the second connection patterns U-BR2 are disposed in a different layer from a layer in which the upper loop coils N-CF are disposed, each of the second connection patterns U-BR2 may be connected to an end of each of the upper loop coils N-CF in an intersecting manner.

The first upper base layer BG1-1 (a lower cover layer) may cover the second connection pattern U-BR2 and may be disposed under the second upper base layer BG1-2. The fifth adhesive layer AD5 may be disposed under the first upper base layer BG1-1.

The first upper bridge pattern E-BR1 may overlap the first non-foldable portion 211. The first upper bridge pattern E-BR1 may be disposed in the first upper contact hole U-CN1 defined so as to extend through the first upper base layer BG1-1 and the second upper base layer BG1-2.

A loop coil adjacent to a boundary between the first non-foldable portion 211 and the foldable portion 213 among the first loop coils RF may be connected to a first anisotropic conductive film ACF1 via the first upper bridge pattern E-BR1.

The second upper bridge pattern E-BR2 may overlap the second non-foldable portion 212. The second upper bridge pattern E-BR2 may be disposed in a second upper contact hole U-CN2 defined so as to extend through the first upper base layer BG1-1 and the second upper base layer BG1-2.

A loop coil adjacent to a boundary between the second non-foldable portion 212 and the foldable portion 213 among the first loop coils RF may be connected to a second anisotropic conductive film ACF2 via the second upper bridge pattern E-BR2.

The holes HL as described in FIG. 4 may be formed so as to extend through the fifth upper base layer BG1-5 to the first upper base layer BG1-1.

The lower layer 220 may be disposed under the upper layer 210. The lower layer 220 may include the first plate 221 and the second plate 222. Each of the first plate 221 and the second plate 222 may include first and second lower base layers BG2-1 and BG2-2.

The first plate 221 may include third-first loop coils F-CF1 of lower loop coils F-CF of the second loop coils CF, and first lower bridge patterns B-BR1. For the convenience of description, a connection relationship between one third-first loop coil F-CF1 of the third-first loop coils F-CF1 and one first lower bridge pattern B-BR1 of the first lower bridge patterns B-BR1 is described by way of example.

The third-first loop coil F-CF1 may be disposed under the second lower base layer BG2-2 (a first cover layer) included in the first plate 221. The third-first loop coil F-CF1 may overlap the foldable portion 213.

The first lower bridge pattern B-BR1 may be disposed in the second lower base layer BG2-2 in the first plate 221. One end of the first lower bridge pattern B-BR1 may be disposed in a first lower contact hole B-CN1 defined in the second lower base layer BG2-2 and may be connected to a corresponding third-first loop coil F-CF1. The other end of the first lower bridge pattern B-BR1 may be connected to the first anisotropic conductive film ACF1 and may be connected to the first upper bridge pattern E-BR1 through the first anisotropic conductive film ACF1. The first anisotropic conductive film ACF1 may be disposed between the first plate 221 and the upper layer 210 so as to overlap the first non-foldable portion 211.

According to this embodiment, one portion of the first lower bridge pattern B-BR1 may overlap the first non-foldable portion 211, and the remaining portion of the first lower bridge pattern B-BR1 may overlap the foldable portion 213.

The first lower base layer BG2-1 (a first cover layer) included in the first plate 221 may cover the third-first loop coil F-CF1 and may be disposed under the second lower base layer BG2-2.

The second plate 222 may include third-second loop coils F-CF2 of the lower loop coils F-CF of the second loop coils CF and the second lower bridge patterns B-BR2. For the convenience of description, a connection relationship between one third-second loop coil F-CF2 of the third-second loop coils F-CF2 and one second lower bridge pattern B-BR2 of the second lower bridge patterns B-BR2 is described by way of example.

The third-second loop coil F-CF2 may be disposed under the second lower base layer BG2-2 (a second cover layer) included in the second plate 222. The third-second loop coil F-CF2 may overlap the foldable portion 213.

The second lower bridge pattern B-BR2 may be disposed in the second lower base layer BG2-2. One end of the second lower bridge pattern B-BR2 may be disposed in a second lower contact hole B-CN2 defined in the second lower base layer BG2-2 and may be connected to a corresponding third-second loop coil F-CF2. The other end of the second lower bridge pattern B-BR2 may be connected to the second upper bridge pattern E-BR2 via the second anisotropic conductive film ACF2. The second anisotropic conductive film ACF2 may be disposed between the second plate 222 and the upper layer 210 so as to overlap the second non-foldable portion 212.

According to this embodiment, one portion of the second lower bridge pattern B-BR2 may overlap the second non-foldable portion 212, and the remaining portion of the second lower bridge pattern B-BR2 may overlap the foldable portion 213.

The first lower base layer BG2-1 (a second cover layer) included in the second plate 222 may cover the third-second loop coil F-CF2 and may be disposed under the second lower base layer BG2-2.

According to an embodiment, the first plate 221 and the second plate 222 may be spaced apart from each other along the first direction DR1 so as to define a predefined space OP therebetween in an area overlapping the foldable portion 213.

The upper layer 210 and the lower layer 220 may be coupled to each other via the fifth adhesive layer AD5. The fifth adhesive layer AD5 may include a first portion AD5-1 and a second portion AD5-2. The first portion AD5-1 and the second portion AD5-2 may be spaced apart from each other while the foldable area FA is disposed therebetween.

In an area overlapping the first non-foldable portion 211, the first portion AD5-1 may be spaced apart from the first anisotropic conductive film ACF1. In an area overlapping the second non-foldable portion 212, the second portion AD5-2 may be spaced apart from the second anisotropic conductive film ACF2.

The first plate 221 and the upper layer 210 overlapping the first non-foldable portion 211 may be coupled to each other via the first portion AD5-1. The second plate 222 and the upper layer 210 overlapping the second non-foldable portion 212 may be coupled to each other via the second portion AD5-2.

According to the present embodiment, a loop coil adjacent to the foldable portion 213 among the upper loop coils N-CF may be connected to the lower loop coils F-CF via the anisotropic conductive film ACF. In an embodiment, for example, a loop coil adjacent to a boundary between the first non-foldable portion 211 and the foldable portion 213 among the first loop coils RF may be connected to the first anisotropic conductive film ACF1 via the first upper bridge pattern E-BR1. The first anisotropic conductive film ACF1 may be connected to the first lower bridge pattern B-BR1 of the first plate 221, and accordingly, the loop coil may be connected to the third-first loop coil F-CF1 overlapping the foldable portion 213 via the first upper bridge pattern E-BR1, the first anisotropic conductive film ACF1, and the first lower bridge pattern B-BR1. The anisotropic conductive film ACF may be embodied as a known anisotropic conductive film.

A loop coil adjacent to a boundary between the second non-foldable portion 212 and the foldable portion 213 among the first loop coils RF may be connected to the second anisotropic conductive film ACF2 via the second upper bridge pattern E-BR2. The second anisotropic conductive film ACF2 may be connected to the second lower bridge pattern B-BR2 of the second plate 222, and, accordingly, the loop coil may be connected to the third-second loop coil F-CF2 overlapping the foldable portion 213 via the second upper bridge pattern E-BR2, the second anisotropic conductive film ACF2, and the second lower bridge pattern B-BR2.

According to an embodiment, the upper loop coils N-CF disposed in the upper layer 210 among the second loop coils CF may not be disposed in the foldable portion 213 in the active area AA (FIG. 2). The lower loop coils F-CF disposed in the lower layer 220 among the second loop coils CF may overlap the foldable portion 213 in the active area AA (FIG. 2). Accordingly, as the lower loop coils F-CF disposed in the lower layer 220 compensate for decrease in sensing sensitivity in the foldable portion 213 of the upper layer 210, the digitizer 200 with improved sensing sensitivity in the foldable area FA may be provided.

FIG. 5A shows an illustrative arrangement relationship of the first loop coils RF disposed in the upper layer 210 in a plan view.

The digitizer 200 (FIG. 4) may include the active area AA and the peripheral area NAA in the plan view. The active area AA may be defined as an area that detects an input from the electromagnetic pen, and the peripheral area NAA may be defined as an area where the bridge patterns are disposed to allow each of the first and second loop coils RF and CF (FIG. 4) to form a loop. The peripheral area NAA may surround the active area AA. The peripheral area NAA may include an edge portion of each of the first non-foldable portion 211, the second non-foldable portion 212, and the foldable portion 213.

Each of the first loop coils RF may include a first portion R1, a second portion R2, and a third portion R3 connected to each other. The first portion R1 may be disposed in the first non-foldable portion 211, the second portion R2 may be disposed in the second non-foldable portion 212, and the third portion R3 may be disposed in the foldable portion 213. According to an embodiment, a line width of the third portion R3 disposed in the foldable portion 213 may be smaller than a line width of each of the first portion R1 and the second portion R2 disposed in the first and second non-foldable portions 211 and 212, respectively.

The first portion R1 may include a first-first pattern R1-1 and a first-second pattern R1-2. The first-first pattern R1-1 and the first-second pattern R1-2 may be disposed in a portion of the first non-foldable portion 211 overlapping the active area AA. Each of the first-first pattern R1-1 and the first-second pattern R1-2 may extend in the first direction DR1. The first-first pattern R1-1 and the first-second pattern R1-2 may be spaced apart from each other in the second direction DR2.

The first connection pattern U-BR1 may be disposed in a portion of each of the first non-foldable portion 211 and the second non-foldable portion 212 overlapping the peripheral area NAA. The first connection pattern U-BR1 may be connected to one end of the first-first pattern R1-1 and one end of the first-second pattern R1-2. The first connection pattern U-BR1 may be disposed on a different layer from a layer on which the first-first pattern R1-1 and the first-second pattern R1-2 are disposed.

In an embodiment, for example, as described in FIG. 4, the first connection pattern U-BR1 may be disposed on the fourth upper base layer BG1-4, while the first-first pattern R1-1 and the first-second pattern R1-2 may be disposed on the third upper base layer BG1-3. The first connection pattern U-BR1 may be connected to each of one end of the first-first pattern R1-1 and one end of the first-second pattern R1-2 via each of contact holes defined in the fourth upper base layer BG1-4.

A connection relationship between the first connection pattern U-BR1, and each of the first-first pattern R1-1 and the first-second pattern R1-2 as above-described may be configured such that the first connection pattern U-BR1 is connected to an end of each of the first-first pattern R1-1 and the first-second pattern R1-2 at an intersecting manner such that in one first loop coil RF, the first connection pattern U-BR1, and the first-first pattern R1-1 and the first-second pattern R1-2 constitute a loop. This connection relationship may be equally applied to each of a plurality of first loop coils RF.

The second portion R2 may include a second-first pattern R2-1 and a second-second pattern R2-2. The second-first pattern R2-1 and the second-second pattern R2-2 may be disposed in a portion of the second non-foldable portion 212 overlapping the active area AA. Each of the second-first pattern R2-1 and the second-second pattern R2-2 may extend in the first direction DR1, and the second-first pattern R2-1 and the second-second pattern R2-2 may be spaced apart from each other in the second direction DR2.

The second-first pattern R2-1 and the first-first pattern R1-1 may be arranged in a line along the first direction DR1 while the foldable portion 213 is interposed therebetween. The second-second pattern R2-2 and the first-second pattern R1-2 may be arranged in a line along the first direction DR1 while the foldable portion 213 is interposed therebetween. Each of the second-first pattern R2-1 and the second-second pattern R2-2 may extend from a portion of the second non-foldable portion 212 overlapping the active area AA to a portion thereof overlapping the peripheral area NAA and then may be connected to a connector CT.

According to the present disclosure, the third portion R3 of each of the first loop coils RF may be disposed in the foldable portion 213. The third portion R3 may include a third-first pattern R3-1 and a third-second pattern R3-2. The third-first pattern R3-1 and the third-second pattern R3-2 may surround a portion of each of corresponding holes among the holes HL. The third-first pattern R3-1 and the third-second pattern R3-2 may be spaced apart from each other along the second direction DR2.

The third-first pattern R3-1 may be connected to the other end of the first-first pattern R1-1 and the other end of the second-first pattern R2-1. Accordingly, the first-first pattern R1-1 and the second-first pattern R2-1 spaced apart from each other while the foldable portion 213 is disposed therebetween may be connected to each other via the third-first pattern R3-1.

The third-second pattern R3-2 may be connected to the other end of the first-second pattern R1-2 and the other end of the second-second pattern R2-2. Accordingly, the first-second pattern R1-2 and the second-second pattern R2-2 spaced apart from each other while the foldable portion 213 is disposed therebetween may be connected to each other via the third-second pattern R3-2.

In FIG. 5B, in a plan view, all of overlapping patterns of the first loop coils RF disposed in the upper layer 210 are shown while layers thereof are not distinguished from each other.

FIG. 5B shows first to sixth coils L-1 to L-6 among the first loop coils RF by way of example. Each of the first to sixth coils L-1 to L-6 may correspond to one of the different first loop coils RF as described in FIG. 5A. Therefore, two portions of each of the first to sixth coils L-1 to L-6 disposed in the first and second non-foldable portions 211 and 212, respectively, may correspond to the first portion R1 and the second portion R2. A portion of each of the first to sixth coils L-1 to L-6 disposed in the foldable portion 213 may correspond to the third portion R3.

Portions of the first to sixth coils L-1 to L-6 disposed in each of the first and second non-foldable portions 211 and 212 may extend in the first direction DR1 and may be spaced apart from each other along the second direction DR2. In an embodiment, for example, in a plan view, the first and second patterns L-1 and L-2 may be disposed adjacent to each other, the third and fourth patterns L-3 and L-4 may be disposed adjacent to each other, and the fifth and sixth patterns L-5 and L-6 may be disposed adjacent to each other.

A spacing in the second direction DR2 between the second wiring L-2 and the third wiring L-3 may be larger than a spacing in the second direction DR2 between the first wiring L-1 and the second wiring L-2. Further, a spacing in the second direction DR2 between the fourth wiring L-4 and the fifth wiring L-5 may be greater than a spacing in the second direction DR2 between the third wiring L-3 and the fourth wiring L-4.

According to an embodiment, each of the holes HL defined in the foldable portion 213 may have a first width WD1 in the first direction DR1. The first width WD1 may be in a range of about 0.1 mm to about 1 mm. Each of the holes HL may have a second width WD2 in the second direction DR2. The second width WD2 may be in a range of about 1 mm to about 10 mm.

In this embodiment, the holes HL may include a first group hole H1 and a second group hole H2. In an embodiment, for example, the first group hole H1 may include a first-first hole H1-1 and a first-second hole H1-2 arranged in the second direction DR2. The second group hole H2 may include a second-first hole H2-1, a second-second hole H2-2, and a second-third hole H2-3 which are spaced apart from the first group hole H1 in the first direction DR1, and are arranged in the second direction DR2. Each of the first group hole H1 and the second group hole H2 may include a plurality of group holes. The first group holes H1 and the second group holes H2 may be disposed in the foldable portion 213 (FIG. 5A) and may be alternately arranged with each other along the first direction DR1.

In this embodiment, the second group hole H2 may be disposed shifted from the first group hole H1 in the second direction DR2 by a predefined distance. According to an embodiment, the predefined distance may be smaller than a half of the second width WD2. Accordingly, a shape of the remaining portion of the foldable portion 213 except for the holes HL may have a lattice-patterned slit shape.

According to this embodiment, a first spacing DS-A in the first direction DR1 between holes HL included in different group holes H1 and H2 and overlapping each other in the first direction DR1 may be in a range of about 0.1 mm to about 1 mm.

A second spacing DS-H in the second direction DR2 between holes HL included in the same group hole and adjacent to each other in the second direction DR2 may be in a range of about 0.1 mm to about 1 mm.

According to an embodiment, a spacing in the second direction DR2 between the second wiring L-2 and the third wiring L-3 may be smaller than or equal to a half of a sum of the second width WD2 and the second spacing DS-H.

According to the present embodiment, a width in the first direction DR1 of the foldable portion 213 may be defined as a spacing from a hole HL closest to the first non-foldable portion 211 to a hole HL closest to the second non-foldable portion 212. According to an embodiment, the width of the foldable portion 213 may be in a range of about 5 mm to about 30 mm.

A portion of each of the first to sixth coils L-1 to L-6 disposed in the foldable portion 213, that is, the third portion R3 in FIG. 5A may be composed of a plurality of pattern portions PP. One pattern portion PP may include a first-first pattern P1-1, a first-second pattern P1-2, a second pattern P2, and a third pattern P3. The first-first pattern P1-1 and the first-second pattern P1-2 may extend in the second direction DR2 and may be spaced apart from each other along the first direction DR1 while a corresponding one hole HL is interposed therebetween. The second pattern P2 may be connected to one end of each of the first-first pattern P1-1 and the first-second pattern P1-2 so as to connect the first-first pattern P1-1 and the first-second pattern P1-2 to each other.

One end of the third pattern P3 may be connected to the other end of the first-second pattern P1-2, while the other end of the third pattern P3 may be connected to the other end of the first-first pattern P1-1 of another pattern portion PP adjacent to the corresponding pattern portion PP.

According to this embodiment, in a plan view, four or smaller coils may be arranged between holes HL adjacent to each other in the second direction DR2.

FIG. 6 shows an example of an arrangement relationship of the upper loop coils N-CF disposed in the upper layer 210 among the second loop coils CF in a plan view. Each of the upper loop coils N-CF may include a first portion C1 and a second portion C2.

The first portion C1 included in one upper loop coil N-CF may be disposed in at least one of the first non-foldable portion 211 or the second non-foldable portion 212, while the second portion C2 included in one upper loop coil N-CF may be disposed in the foldable portion 213.

The first portion C1 may include a first pattern C1-1 and a second pattern C1-2 connected to each other.

Each of the first pattern C1-1 and the second pattern C1-2 may extend in the second direction DR2, while the first pattern C1-1 and the second pattern C1-2 may be spaced apart from each other along the first direction DR1. A portion of each of the first pattern C1-1 and the second pattern C1-2 may be disposed in the active area AA, and the remaining portion thereof may be disposed in the peripheral area NAA. One end and the other end of each of the first pattern C1-1 and the second pattern C1-2 extending to the peripheral area NAA may be connected to a corresponding second connection pattern U-BR2. The second connection patterns U-BR2 may extend along the peripheral area NAA and may be connected to the connector CT. Therefore, the second connection patterns U-BR2 disposed in the first non-foldable portion 211 may extend between holes HL overlapping the peripheral area NAA among the holes HL of the foldable portion 213. The second connection patterns U-BR2 disposed in the second non-foldable portion 212 may be spaced apart from the holes HL overlapping the peripheral area NAA.

The connection patterns U-BR2 may be disposed in a portion of each of the first non-foldable portion 211 and the second non-foldable portion 212 overlapping the peripheral area NAA. One second connection pattern U-BR2 may be connected to one end of each of the first pattern C1-1 and the second pattern C1-2, while another second connection pattern U-BR2 may be connected to the other end of each of the first pattern C1-1 and the second pattern C1-2. The second connection patterns U-BR2 may be disposed on a different layer from a layer on which the first pattern C1-1 and the second pattern C1-2 are disposed.

In an embodiment, for example, as described in FIG. 4, the second connection patterns U-BR2 may be disposed under the second upper base layer BG1-2, while the first pattern C1-1 and the second pattern C1-2 may be disposed under the third upper base layer BG1-3. The second connection patterns U-BR2 may be connected to each of the first pattern C1-1 and the second pattern C1-2 via each of contact holes defined in the second upper base layer BG1-2.

The connection relationship between the second connection pattern U-BR2 and each of the first pattern C1-1 and the second pattern C1-2 as above-described may be configured such that the second connection pattern U-BR2 is connected to an end of each of the first pattern C1-1 and the second pattern C1-2 in an intersecting manner such that in one upper loop coil N-CF, the second connection pattern U-BR2, the first pattern C1-1, and the second pattern C1-2 constitute a loop. This connection relationship may be equally applied to each of a plurality of upper loop coils N-CF.

The second portion C2 may be disposed in a portion of the foldable portion 213 overlapping the peripheral area NAA. When the first pattern C1-1 of the first portion C1 is disposed in the first non-foldable portion 211 and the second pattern C1-2 thereof is disposed in the second non-foldable portion 212, the second portion C2 may be a pattern connecting the first pattern C1-1 disposed in the first non-foldable portion 211 and the second pattern C1-2 disposed in the second non-foldable portion 212 to each other.

According to an embodiment, at least one of the upper loop coils N-CF disposed in the second non-foldable portion 212 may not include at least one of the second portion C2 and the second connection patterns U-BR2 overlapping the foldable portion 213.

According to the present disclosure, the upper loop coil N-CF disposed in the upper layer 210 among the second loop coils CF may be not disposed in a portion of the foldable portion 213 overlapping the active area AA. Accordingly, sensing the electromagnetic pen in the foldable portion 213 may be desirable to be compensated for.

Figure 7:
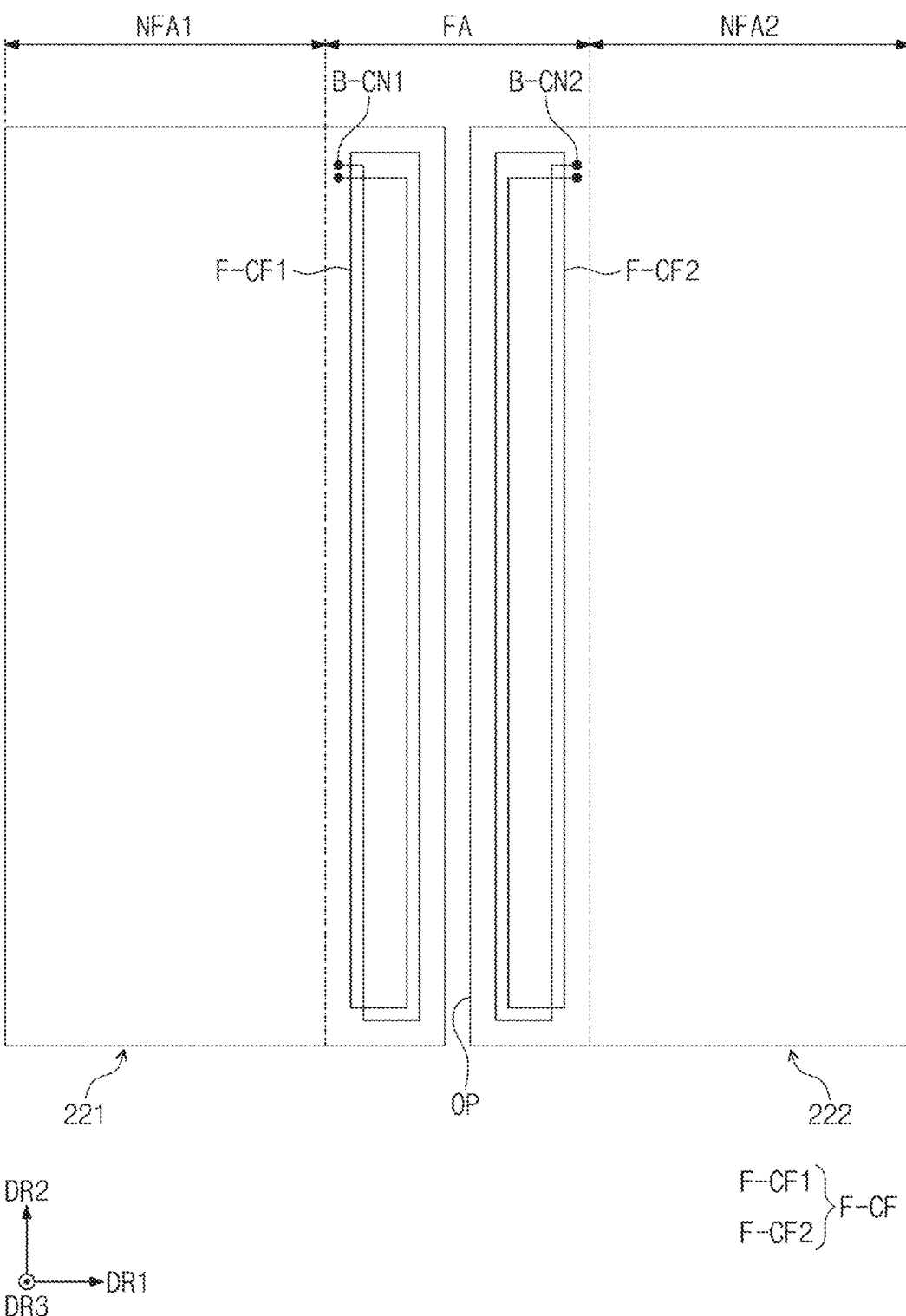
FIG. 7 is a plan view of a digitizer according to an embodiment of the present disclosure.

FIG. 7 shows an example of an arrangement relationship of the lower loop coil F-CF disposed in the lower layer 220 among the second loop coils CF in a plan view. The lower loop coil F-CF may include a third-first loop coil F-CF1 disposed in the first plate 221 and a third-second loop coil F-CF2 disposed in the second plate 222.

FIG. 7 shows one loop coil constituting an open loop in each of the first plate 221 and the second plate 222. The present disclosure is not limited thereto, and in another embodiment, each of the first plate 221 and the second plate 222 may include a plurality of coils, each constituting an open loop. The present disclosure is not limited to any one embodiment.

The third-first loop coil F-CF1 may be disposed in a portion of the first plate 221 overlapping the foldable area FA. The first lower bridge patterns B-BR1 as described in FIG. 4 may be connected to start and end points of the third-first loop coil F-CF1, respectively, constituting an open loop. Each of the first lower bridge patterns B-BR1 may be disposed in a corresponding first lower contact hole B-CN1. One end of each of the first lower bridge patterns B-BR1 may be connected to one end of the third-first loop coil F-CF1, and the other end of each of the first lower bridge patterns B-BR1 may be connected to the first anisotropic conductive film ACF1 as described in FIG. 4. The first anisotropic conductive film ACF1 may be connected to the first upper bridge pattern E-BR1.

The third-first loop coil F-CF1 may be connected to the second-first loop coils N-CF1 via the first lower bridge pattern B-BR1, the first anisotropic conductive film ACF1, and the first upper bridge pattern E-BR1.

The third-second loop coil F-CF2 may be disposed in a portion of the second plate 222 overlapping the foldable area FA. The second lower bridge patterns B-BR2 as described in FIG. 4 may be connected to starting and ending points of the third-second loop coil F-CF2 constituting an open loop, respectively. Each of the second lower bridge patterns B-BR2 may be disposed in a corresponding second lower contact hole B-CN2. One end of each of the second lower bridge patterns B-BR2 may be connected to one end of the third-second loop coil F-CF2, while the other end of the third-second loop coil F-CF2 may be connected to the second anisotropic conductive film ACF2 as described in FIG. 4. The second anisotropic conductive film ACF2 may be connected to the second upper bridge pattern E-BR2.

The third-second loop coil F-CF2 may be connected to the second-second loop coils N-CF2 via the second lower bridge pattern B-BR2, the second anisotropic conductive film ACF2, and the second upper bridge pattern E-BR2.

According to the present disclosure, the upper loop coils N-CF of the second loop coils RF may not be disposed in an area of the upper layer 210 overlapping the foldable portion 213. The lower loop coils F-CF connected to corresponding upper loop coils N-CF may be disposed in an area of each of the first and second plates 221 and 222 of the lower layer 220 overlapping the foldable portion 213. Therefore, the digitizer 200 according to the present disclosure may sense the input from the electromagnetic pen in the foldable area FA in a similar manner to a manner in which the digitizer 200 senses the input from the electromagnetic pen in in the non-folding areas NFA1 and NFA2. Accordingly, the present disclosure may provide the electronic device 1000 with improved sensing sensitivity in the foldable area FA (FIG. 1A).

The above-described third-first loop coil F-CF1 and third-second loop coil F-CF2 may be connected to the first pattern C1-1 (FIG. 6) and the second pattern C1-2 (FIG. 6) of the upper layer 210 adjacent to the foldable portion 213, respectively, to form a single open loop. Further, each of the third-first loop coil F-CF1 and the third-second loop coil F-CF2 may be one driving coil constituting one open loop. The present disclosure is not limited to any one embodiment.

Figure 8A:
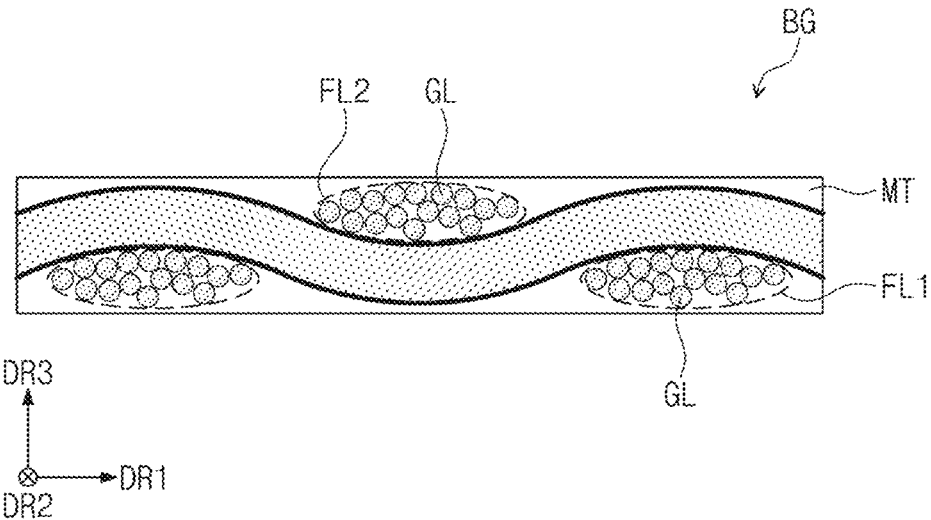
FIG. 8A is a cross-sectional view of a base layer included in a digitizer according to an embodiment of the present disclosure.
Figure 8B:
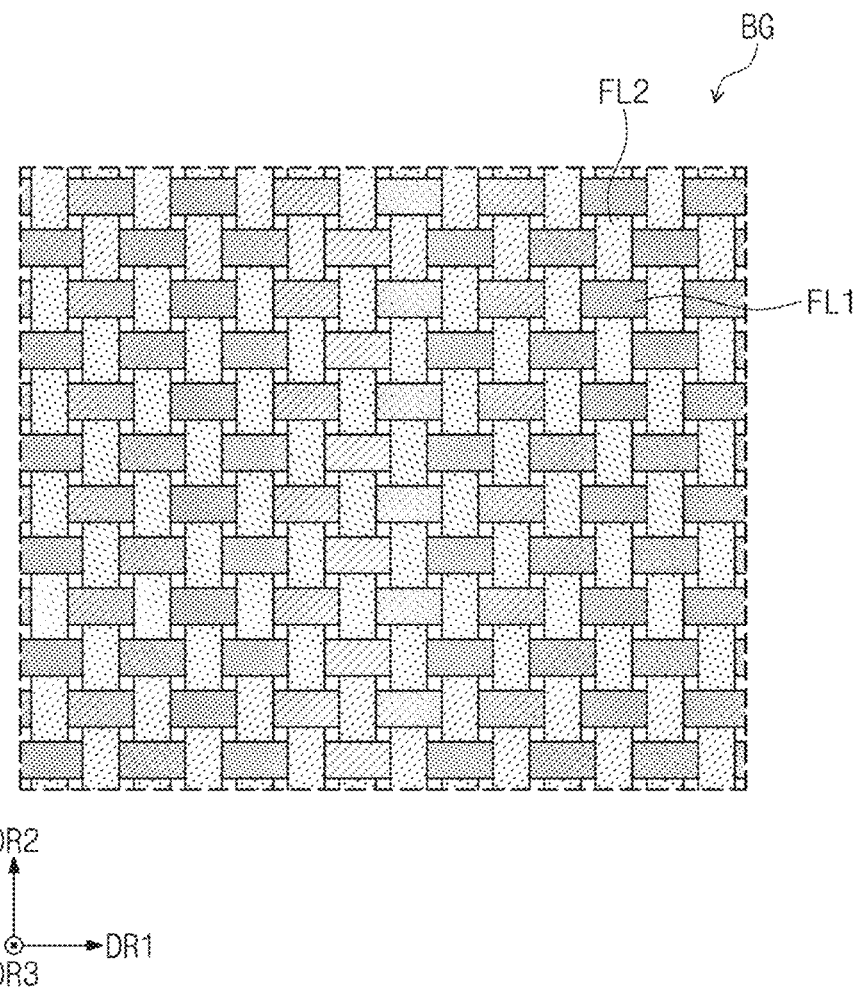
FIG. 8B is a plan view of a base layer included in a digitizer according to an embodiment of the present disclosure.

FIG. 8A is a cross-sectional view of a base layer included in a digitizer according to an embodiment of the present disclosure. FIG. 8B is a plan view of a base layer included in a digitizer according to an embodiment of the present disclosure.

Referring to FIG. 8A and FIG. 8B, a base layer BG according to the present disclosure may include a matrix MT including fillers and woven fiber lines FL1 and FL2 disposed in the matrix MT. The base layer BG as described in FIG. 8A and FIG. 8B may correspond to each of the first to fifth upper base layers BG1-1 to BF1-5 and the first and second lower base layers BG2-1 and BG2-2.

The fiber lines FL1 and FL2 may be alternately arranged with each other along each of the first direction DR1 and the second direction DR2 to have a fabric shape in a plan view. Each of the fiber lines FL1 and FL2 may be provided in a form of a bundle in which a plurality of strand lines GL are gathered. A diameter of one strand line GL included in one fiber line may be in a range of 3 μm to 10 μm.

The strand lines GL included in each of the fiber lines FL1 and FL2 may include a reinforced fiber composite. In an embodiment, for example, the reinforced fiber composite may be embodied as carbon fiber reinforced plastic (CFRP) or glass fiber reinforced plastic (GFRP).

The fiber lines FL1 and FL2 may be disposed in the matrix MT. The matrix MT according to an embodiment may include at least one of epoxy, polyester, polyamides, polycarbonates, polypropylene, polybutylene, and vinyl ester.

The matrix MT may contain the fillers. The filler may include at least one of silica, barium sulphate, sintered talc, barium titanate, titanium oxide, clay, alumina, mica, boehmite, zinc borate, and zinc tin oxide.

According to the present disclosure, each of the base layers included in the digitizer 200 (FIG. 4) includes the bundle of fibers made of the reinforced fiber composite disposed in the matrix MT. Thus, during the folding operation of the electronic device 1000, the digitizer 200 may protect a lower part of the display module 100 (FIG. 2).

Therefore, the digitizer 200 of the present disclosure may be a component that functions as a sensing member that senses an input of an electromagnetic pen while simultaneously serving as a protection member. Accordingly, a separate metal plate protecting the display module 100 may be omitted. Therefore, a manufacturing cost of the electronic device may be reduced and a slim electronic device 1000 may be provided.

Figure 9:
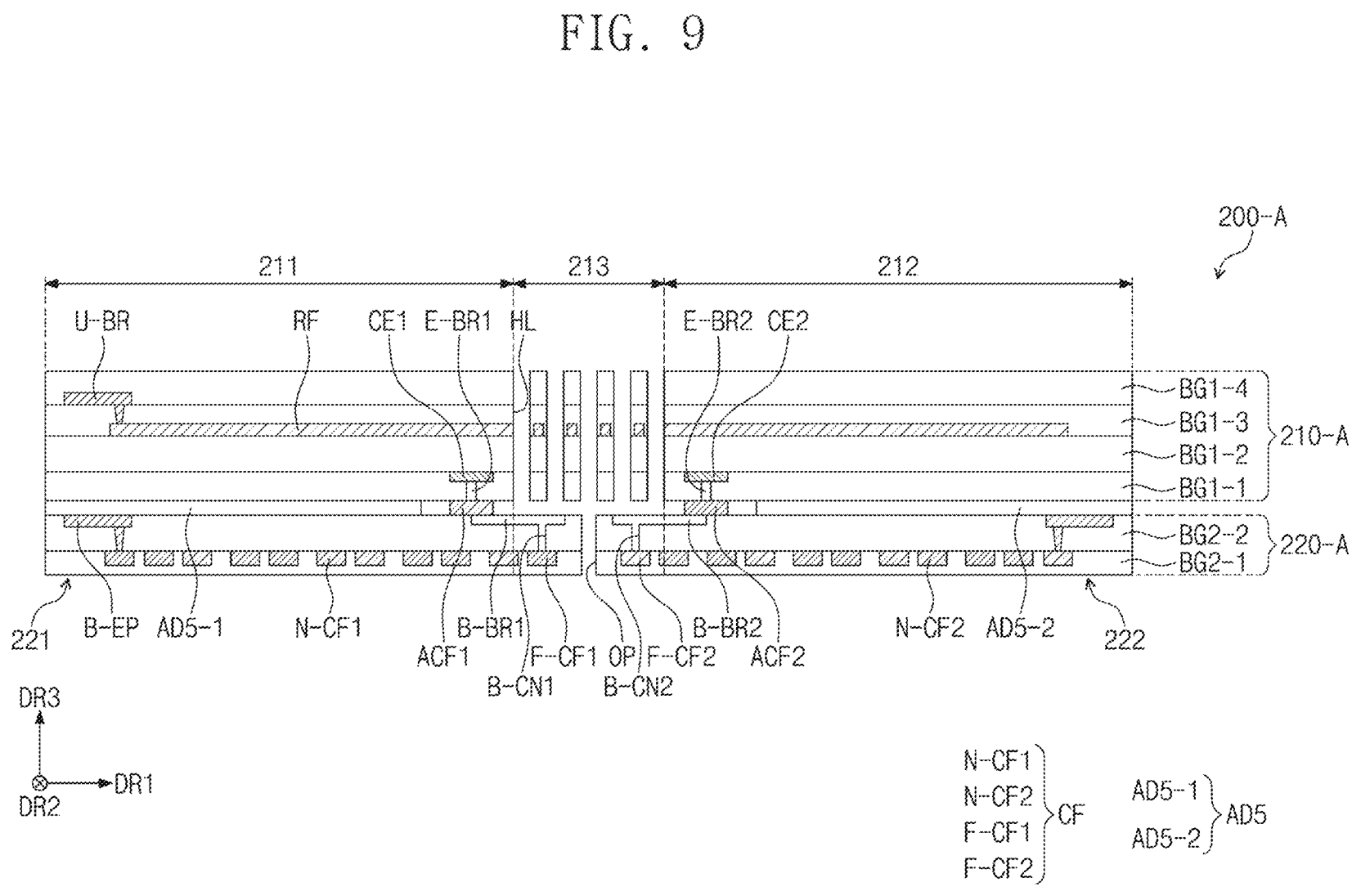
Figure 10:
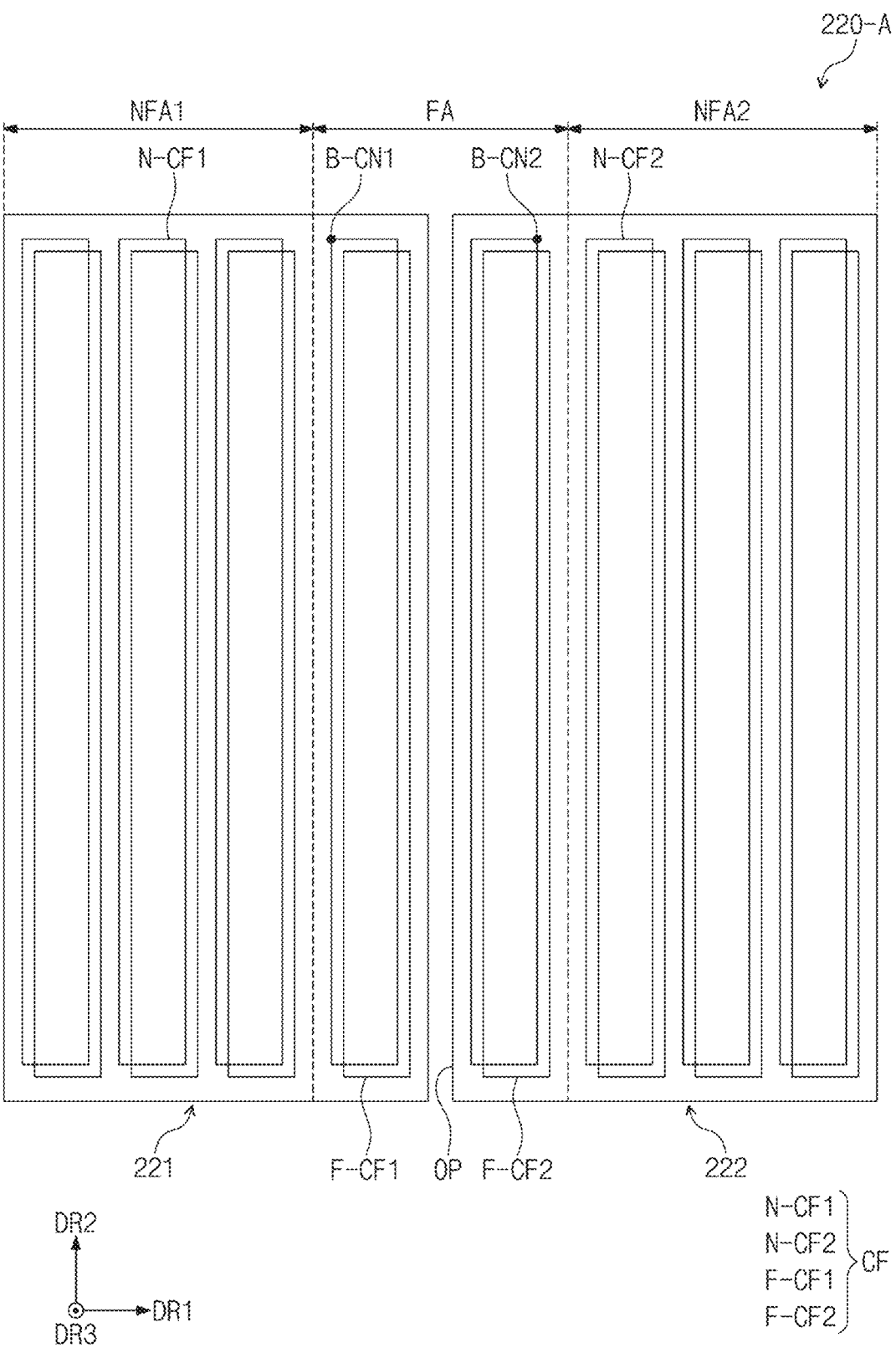
FIG. 10 is a plan view of a digitizer according to an embodiment of the present disclosure.

FIG. 9 is a cross-sectional view of a digitizer according to an embodiment of the present disclosure. FIG. 10 is a plan view of a digitizer according to an embodiment of the present disclosure. The same/similar reference numerals are allocated to components identical/similar to those as described in FIG. 1A to FIG. 8B, and redundant descriptions thereof are omitted.

Referring to FIG. 9 and FIG. 10, a digitizer 200-A according to an embodiment may include an upper layer 210-A and a lower layer 220-A.

The upper layer 210-A may include the first to fourth upper base layers BG1-1 to BF1-4, the first loop coils RF, a connection pattern U-BR, the upper bridge patterns E-BR1 and E-BR2, and upper patterns CE1 and CE2.

The lower layer 220-A may include the first and second lower base layers BG2-1 and BG2-2, the second loop coils RF, a lower connection pattern B-EP, and the lower bridge patterns B-BR1 and B-BR2.

The first loop coils RF may be disposed on a top surface of the second upper base layer BG1-2. According to the present disclosure, the first loop coils RF may overlap each of the first non-foldable portion 211, the second non-foldable portion 212, and the foldable portion 213 of the upper layer 210. An arrangement relationship in the plan view of the first loop coils RF may correspond to the arrangement relationship in the plan view of the first loop coils RF as described in FIG. 5A and FIG. 5B.

The upper base layer BG1-3 may cover the first loop coils RF and may be disposed on the second upper base layer BG1-2.

The connection pattern U-BR may be disposed on the third upper base layer BG1-3. The connection pattern U-BR may be connected to a corresponding first loop coil RF via a contact hole defined in the third upper base layer BG1-3. A plurality of connection patterns U-BR may be provided. As the connection patterns U-BR are disposed in a different layer from a layer in which the first loop coils RF are disposed, the connection pattern U-BR may be connected to an end of each of the first loop coils RF in an intersecting manner.

The upper base layer BG1-4 may cover the connection pattern U-BR and may be disposed on the third upper base layer BG1-3. The fourth adhesive layer AD4 as described in FIG. 3 may be disposed on the fourth upper base layer BG1-4.

The upper patterns CE1 and CE2 may be disposed on a bottom surface of the second upper base layer BG1-2. The first upper pattern CE1 may be disposed in a portion of the first non-foldable portion 211 adjacent to the foldable portion 213. The second upper pattern CE2 may be disposed in a portion of the second non-foldable portion 212 adjacent to the foldable portion 213. The upper patterns CE1 and CE2 may be patterns that connect the second loop coils CF disposed on the lower layer 220-A to the connector CT as described in FIG. 6.

The first upper base layer BG1-1 may cover the upper patterns CE1 and CE2 and may be disposed under the second upper base layer BG1-2. The fifth adhesive layer AD5 may be disposed under the first upper base layer BG1-1. The fifth adhesive layer AD5 may include the first portion AD5-1 and the second portion AD5-2. The first portion AD5-1 and the second portion AD5-2 may be spaced apart from each other while the foldable area FA is disposed therebetween.

In an area overlapping the first non-foldable portion 211, the first portion AD5-1 may be spaced apart from the first anisotropic conductive film ACF1. In an area overlapping the second non-foldable portion 212, the second portion AD5-2 may be spaced apart from the second anisotropic conductive film ACF2.

The first upper bridge pattern E-BR1 may be disposed in the first non-foldable portion 211. The first upper bridge pattern E-BR1 may be disposed in a contact hole defined so as to extend through the first upper base layer BG1-1. The first upper pattern CE1 may be connected to the first anisotropic conductive film ACF1 via the first upper bridge pattern E-BR1.

The second upper bridge pattern E-BR2 may be disposed in the second non-foldable portion 212. The second upper bridge pattern E-BR2 may be disposed in a contact hole defined so as to extend through the first upper base layer BG1-1. The second upper pattern CE2 may be connected to the second anisotropic conductive film ACF2 via the second upper bridge pattern E-BR2.

The holes HL as described in FIG. 4 may be formed so as to extend through the fourth upper base layer BG1-4 to the first upper base layer BG1-1.

The lower layer 220-A may be disposed under the upper layer 210-A.

The lower layer 220-A may include the first plate 221 and the second plate 222. According to an embodiment, the first plate 221 and the second plate 222 may be spaced apart from each other along the first direction DR1 so as to define a predefined space OP therebetween in an area overlapping the foldable portion 213. Each of the first plate 221 and the second plate 222 may include the first and second lower base layers BG2-1 and BG2-2.

As shown in FIG. 10, the first plate 221 may include the second-first loop coils N-CF1 overlapping the first non-foldable portion 211 and the third-first loop coil F-CF1 overlapping the foldable portion 213.

The second-first loop coils N-CF1 and third-first loop coil F-CF1 may be disposed under the second lower base layer BG2-2 (a first base layer) included in the first plate 221.

The first lower bridge pattern B-BR1 may be disposed in the second lower base layer BG2-2. One end of the first lower bridge pattern B-BR1 may be disposed in the first lower contact hole B-CN1 defined in the second lower base layer BG2-2 and may be connected to the third-first loop coil F-CF1. The other end of the first lower bridge pattern B-BR1 may be connected to the first anisotropic conductive film ACF1 and may be connected to the first upper bridge pattern E-BR1.

According to this embodiment, one portion of the first lower bridge pattern B-BR1 may overlap the first non-foldable portion 211, and the remaining portion of the first lower bridge pattern B-BR1 may overlap the foldable portion 213.

The first lower base layer BG2-1 (a first cover layer) included in the first plate 221 may cover the second-first loop coils N-CF1 and third-first loop coil F-CF1, and may be disposed under the second lower base layer BG2-2.

As shown in FIG. 10, the second plate 222 may include the second-second loop coils N-CF2 overlapping the second non-foldable portion 212 and the third-second loop coil F-CF2 overlapping the foldable portion 213.

The second-second loop coils N-CF2 and the third-second loop coil F-CF2 may be disposed under the second lower base layer BG2-2 (a second base layer) included in the second plate 222.

The second lower bridge pattern B-BR2 may be disposed in the second lower base layer BG2-2. One end of the second lower bridge pattern B-BR2 may be disposed in the second lower contact hole B-CN2 defined in the second lower base layer BG2-2 and may be connected to the third-second loop coil F-CF2. The other end of the second lower bridge pattern B-BR2 may be connected to the second anisotropic conductive film ACF2 and may be connected to the second upper bridge pattern E-BR2 through the second anisotropic conductive film ACF2.

According to this embodiment, one portion of the second lower bridge pattern B-BR2 may overlap the second non-foldable portion 212, and the remaining portion of the second lower bridge pattern B-BR2 may overlap the foldable portion 213.

The first lower base layer BG2-1 (a second cover layer) included in the second plate 222 may cover the second-second loop coils N-CF2 and the third-second loop coil F-CF2, and may be disposed under the second lower base layer BG2-2.

The lower layer 220-A according to an embodiment may further include the lower connection pattern B-EP. The lower connection pattern B-EP may be disposed in the second lower base layer BG2-2 and may be connected to corresponding second loop coils CF via a contact hole defined in the second lower base layer BG2-2. The lower connection pattern B-EP may be connected to an end of each of the second loop coils CF in an intersecting manner.

According to an embodiment of the present disclosure, the driving loop coils not disposed in a portion of the upper layer of the digitizer overlapping the foldable area may be disposed in the lower layer of the digitizer. Thus, an electronic device having improved sensing sensitivity in the foldable area may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a display panel divided into:
   a first non-foldable area and a second non-foldable area spaced apart from each other along a first direction, and
   a foldable area in which the display panel is foldable around a folding axis extending along a second direction intersecting the first direction, wherein the foldable area is disposed between the first non-foldable area and the second non-foldable area; and
a digitizer disposed under the display panel and including upper and lower layers,
wherein the upper layer is divided into:
   a first non-foldable portion overlapping the first non-foldable area;
   a second non-foldable portion overlapping the second non-foldable area; and
   a foldable portion overlapping the foldable area, wherein a plurality of holes are defined in the foldable portion,
wherein the lower layer includes a first plate and a second plate spaced apart from each other along the first direction so as to define a space therebetween in an area overlapping the foldable portion,
wherein the upper layer includes:
   a base layer;
   first loop coils disposed on the base layer;
   second-first loop coils disposed under the base layer and overlapping the first non-foldable portion; and
   second-second loop coils disposed under the base layer and overlapping the second non-foldable portion,
wherein the lower layer includes:
   third-first loop coil disposed in the first plate and overlapping the foldable portion; and
   third-second loop coil disposed in the second plate and overlapping the foldable portion.

2. The electronic device of claim 1, wherein a second-first loop coil adjacent to a boundary between the first non-foldable portion and the foldable portion among the second-first loop coils is connected to the third-first loop coil via a first anisotropic conductive film,
   wherein a second-second loop coil adjacent to a boundary between the second non-foldable portion and the foldable portion among the second-second loop coils is connected to the third-second loop coil via a second anisotropic conductive film.

3. The electronic device of claim 2, wherein the first anisotropic conductive film is disposed between the upper layer and the first plate so as to overlap the first non-foldable portion,
   wherein the second anisotropic conductive film is disposed between the upper layer and the second plate so as to overlap the second non-foldable portion.

4. The electronic device of claim 3, further comprising:
   a first adhesive layer disposed between the upper layer and the first plate so as to overlap the first non-foldable portion; and

26 a second adhesive layer disposed between the upper layer and the second plate so as to overlap the second non-foldable portion,
   wherein in an area overlapping the first non-foldable portion, the first adhesive layer is spaced apart from the first anisotropic conductive film,
   wherein in an area overlapping the second non-foldable portion, the second adhesive layer is spaced apart from the second anisotropic conductive film.

5. The electronic device of claim 3, wherein the upper layer further includes:
   an upper base layer disposed on the base layer so as to cover the first loop coils;
   an upper cover layer disposed on the upper base layer;
   a lower base layer disposed under the base layer so as to cover the second-first loop coils and the second-second loop coils; and
   a lower cover layer disposed under the lower base layer,
   wherein the holes extend through the upper cover layer, the lower cover layer and all layers therebetween.

6. The electronic device of claim 5, wherein the upper layer further includes a connection pattern disposed between the upper base layer and the upper cover layer,
   wherein the connection pattern is connected to a corresponding first loop coil among the first loop coils via a contact hole extending through the upper base layer.

7. The electronic device of claim 5, wherein the upper layer further includes:
   a first upper bridge pattern disposed in a first contact hole extending through the lower base layer and the lower cover layer, wherein the first upper bridge pattern connects the second-first loop coil adjacent to the boundary and the first anisotropic conductive film to each other; and
   a second upper bridge pattern disposed in a second contact hole extending through the lower base layer and the lower cover layer, wherein the second upper bridge pattern connects the second-second loop coil adjacent to the boundary and the second anisotropic conductive film to each other.

8. The electronic device of claim 7, wherein the first plate further includes:
   a first base layer in which the third-first loop coil is disposed; and
   a first cover layer covering the third-first loop coil and disposed under the first base layer,
   wherein the second plate further includes:
      a second base layer in which the third-second loop coil is disposed; and
      a second cover layer covering the third-second loop coil and disposed under the second base layer.

9. The electronic device of claim 8, wherein the lower layer further includes:
   a first lower bridge pattern disposed in a third contact hole extending through the first base layer, wherein the first lower bridge pattern connects the first anisotropic conductive film and the third-first loop coil to each other; and
   a second lower bridge pattern disposed in a fourth contact hole extending through the second base layer, wherein the second lower bridge pattern connects the second anisotropic conductive film and the third-second loop coil to each other.

10. The electronic device of claim 9, wherein at least a portion of each of the first lower bridge pattern and the second lower bridge pattern overlaps the foldable portion.

11. The electronic device of claim 8, wherein each of the base layer, the upper base layer, the upper cover layer, the lower base layer, the lower cover layer, the first base layer, the first cover layer, the second base layer, and the second cover layer includes:

a matrix containing fillers; and a reinforced fiber composite disposed in the matrix and including one of reinforcing fiber plastic and carbon fiber plastic.

12. The electronic device of claim 11, wherein the matrix includes at least one of epoxy, polyester, polyamides, polycarbonates, polypropylene, polybutylene, or vinyl ester, wherein the filler includes at least one of silica, barium sulphate, sintered talc, barium titanate, titanium oxide, clay, alumina, mica, boehmite, zinc borate, or zinc tin oxide.

13. The electronic device of claim 1, wherein the digitizer includes an active area for detecting an external input, and a peripheral area surrounding the active area, wherein each of the first loop coils is partially disposed in at least one of the active area in the foldable portion and the peripheral area in the foldable portion, wherein the second-first loop coils and the second-second loop coils are not disposed in a portion of the active area in the foldable portion.

14. The electronic device of claim 13, wherein a number of the first loop coils disposed between two holes adjacent along the second direction among the holes is 4 or smaller.

15. The electronic device of claim 1, wherein the holes are classified into:

a first group hole including holes arranged along the second direction; and a second group hole including holes arranged along the second direction and spaced apart from the first group hole along the first direction, wherein the second group hole is disposed shifted by a predefined distance from the first group hole in the second direction.

16. The electronic device of claim 1, wherein a width in the first direction of each of the holes is in a range of about 0.1 millimeters (mm) to about 1.0 mm, herein a width in the second direction of each of the holes is in a range of about 1 mm to about 10 mm.

17. The electronic device of claim 1, wherein a spacing between two holes adjacent to each other along the first direction is in a range of about 0.1 mm to about 1.0 mm, wherein a spacing between two holes adjacent to each other along the second direction is in a range of about 0.1 mm to about 1.0 mm.

18. The electronic device of claim 1, wherein a dimension in the first direction from a hole closest to the first non-foldable portion to a hole closest to the second non-foldable portion is in a range of about 5 mm to about 30 mm.

19. The electronic device of claim 1, wherein the digitizer detects an external input based on electromagnetic resonance (EMR).

\* \* \* \* \*